(12) United States Patent
Chou

(10) Patent No.: US 10,928,554 B2
(45) Date of Patent: *Feb. 23, 2021

(54) PLASTIC LENS ELEMENT, PLASTIC ANNULAR OPTICAL ELEMENT, LENS MODULE AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/686,305

(22) Filed: Nov. 18, 2019

(65) Prior Publication Data

US 2020/0081156 A1    Mar. 12, 2020

Related U.S. Application Data

(63) Continuation of application No. 15/926,106, filed on Mar. 20, 2018, now Pat. No. 10,527,756.

(30) Foreign Application Priority Data

Aug. 28, 2017   (TW) .................................. 106129202

(51) Int. Cl.
    *G02B 1/04*       (2006.01)
    *G02B 27/09*      (2006.01)
    (Continued)

(52) U.S. Cl.
    CPC .............. *G02B 1/041* (2013.01); *G02B 7/021* (2013.01); *G02B 7/022* (2013.01); *G02B 27/0018* (2013.01); *G02B 27/0955* (2013.01)

(58) Field of Classification Search
    CPC .... G02B 1/041; G02B 7/022; G02B 27/0018; G02B 7/021; G02B 27/0955; G02B 3/08; G02B 7/02
    See application file for complete search history.

(56) References Cited

U.S. PATENT DOCUMENTS 7,209,301 B2   4/2007   Chao
8,842,376 B2   9/2014   Yang et al.
(Continued)

FOREIGN PATENT DOCUMENTS

TW   M529856 U   10/2016
TW   M531602 U   11/2016

*Primary Examiner* — Michelle M Iacoletti
*Assistant Examiner* — Danell L Owens
(74) *Attorney, Agent, or Firm* — McClure, Qualey & Rodack, LLP

(57) ABSTRACT

A plastic lens element includes an optical effective portion and a lens peripheral portion in order from a central axis to an edge of the plastic lens element. The lens peripheral portion surrounds the optical effective portion and includes a plurality of curve-shaped strip structures. Each of the curve-shaped strip structures is located and extended along a radial direction of the central axis. Each of the curve-shaped strip structures is curved in a concave form. The curve-shaped strip structures are prearranged in a circumferential direction of the central axis and around the optical effective portion. The curve-shaped strip structures are not directly connected to the optical effective portion.

26 Claims, 30 Drawing Sheets

(51) Int. Cl.
*G02B 7/02* (2006.01)
*G02B 27/00* (2006.01)

(56) References Cited

U.S. PATENT DOCUMENTS

| | | |
|---|---|---|
| 8,908,282 B2 | 12/2014 | Yang et al. |
| 10,527,756 B2 * | 1/2020 | Chou .................... G02B 7/021 |
| 2014/0340771 A1 | 11/2014 | Wakabayashi et al. |
| 2015/0253569 A1 | 9/2015 | Lin |
| 2016/0370556 A1 | 12/2016 | Ito |
| 2016/0377828 A1 | 12/2016 | Ito |
| 2017/0072650 A1 | 3/2017 | Chern et al. |
| 2017/0131513 A1 | 5/2017 | Lin et al. |
| 2017/0146699 A1 | 5/2017 | Chou |
| 2018/0003916 A1 | 1/2018 | Lin et al. |
| 2018/0003959 A1 | 1/2018 | Lin et al. |

\* cited by examiner

PLASTIC LENS ELEMENT, PLASTIC ANNULAR OPTICAL ELEMENT, LENS MODULE AND ELECTRONIC DEVICE

RELATED APPLICATIONS

The present application is a continuation of the application Ser. No. 15/926,106 filed Mar. 20, 2018, now U.S. Pat. No. 10,527,756, the entire contents of which are hereby incorporated herein by reference, which claims priority to Taiwan Application Serial Number 106129202, filed Aug. 28, 2017, which is herein incorporated by reference.

BACKGROUND

Technical Field

The present disclosure relates to a plastic lens element, a plastic annular optical element and a lens module, More particularly, the present disclosure relates to a plastic lens element, a plastic annular optical element and a lens module which are applicable to portable electronic devices.

Description of Related Art

In order to satisfy the specification of the lens module featured with the large aperture and high resolution, the plastic lens element has the trend of being thinner. The thin lens element requires a larger optical effective portion, so that the outer diameter of the thin lens element is required to be larger.

FIG. 11 is a schematic view of a conventional plastic lens element 80. In FIG. 11, the conventional plastic lens element 80 easily shrinks unevenly after molding so as to warp. For example, before molding, the conventional plastic lens element 80 under simulation has a central line x along a radial direction of a central axis z. However, after molding, the conventional plastic lens element 80 actually has a central line x1 being bended along the radial direction of the central axis z, and thereby the quality of an optical effective portion of the conventional plastic lens element 80 would be affected.

FIG. 12A is a schematic view of a conventional plastic lens element 90, and FIG. 12B is a top view of the conventional plastic lens element 90. In FIG. 12A and FIG. 12B, the conventional plastic lens element 90 serves as a solution for the injection molding process of the conventional plastic lens element aforementioned in the last paragraph. The conventional plastic lens element 90 has the design of a gate trace 93 of a narrow runner for an optical effective portion featured with the better quality. However, when a plurality of the strip structures 91 are added on the conventional plastic lens element 90, the conventional plastic lens element 90 easily has an uneven shrinkage along a shrinkage direction SD, and thereby the design purposes of the gate trace 93 of the narrow runner for the conventional plastic lens element 90 as a thin lens element would not be achieved. A Fine line 95 would occur on the surface of the optical effective portion so as to affect the optical features of the conventional plastic lens element 90.

In addition, if each of the strip structures of the conventional plastic lens element is divided into segments, it will result in increasing unnecessary additional partial thickness of the conventional plastic lens element, spending more time for mold machining, and increasing unnecessary cost.

Given the above, how to improve a plastic lens element and a plastic annular optical element, so as to provide structural solutions therefor to satisfy the design specification of a lens module featured with the large aperture and high resolution, has become one of the important subjects.

SUMMARY

According to one aspect of the present disclosure, a plastic lens element includes an optical effective portion and a lens peripheral portion in order from a central axis to an edge of the plastic lens element. The lens peripheral portion surrounds the optical effective portion and includes a plurality of curve-shaped strip structures. Each of the curve-shaped strip structures is located and extended along a radial direction of the central axis. Each of the curve-shaped strip structures is curved in a concave form. The curve-shaped strip structures are prearranged in a circumferential direction of the central axis and around the optical effective portion. The curve-shaped strip structures are not directly connected to the optical effective portion.

According to another aspect of the present disclosure, a lens module includes an optical lens set. The optical lens set includes a plurality of optical elements, wherein one of the optical elements is the plastic lens element according to the foregoing aspect.

According to another aspect of the present disclosure, an electronic device includes the lens module according to the foregoing aspect.

According to another aspect of the present disclosure, a plastic annular optical element includes an outer diameter surface and an Inner annular surface. The outer diameter surface surrounds a central axis of the plastic annular optical element. The inner annular surface surrounds the central axis and forms a central hole. The inner annular surface includes a plurality of curve-shaped strip structures, wherein each of the curve-shaped strip structures is located and extended along a radial direction of the central axis, each of the curve-shaped strip structures is curved in a concave form, and the curve-shaped strip structures are prearranged in a circumferential direction of the central axis and around the central hole.

According to another aspect of the present disclosure, a lens module includes an optical lens set. The optical lens set includes a plurality of optical elements, wherein one of the optical elements is the plastic annular optical element according to the foregoing aspect.

According to another aspect of the present disclosure, an electronic device includes the lens module according to the foregoing aspect.

DETAILED DESCRIPTION

1st Embodiment

Figure 1A:
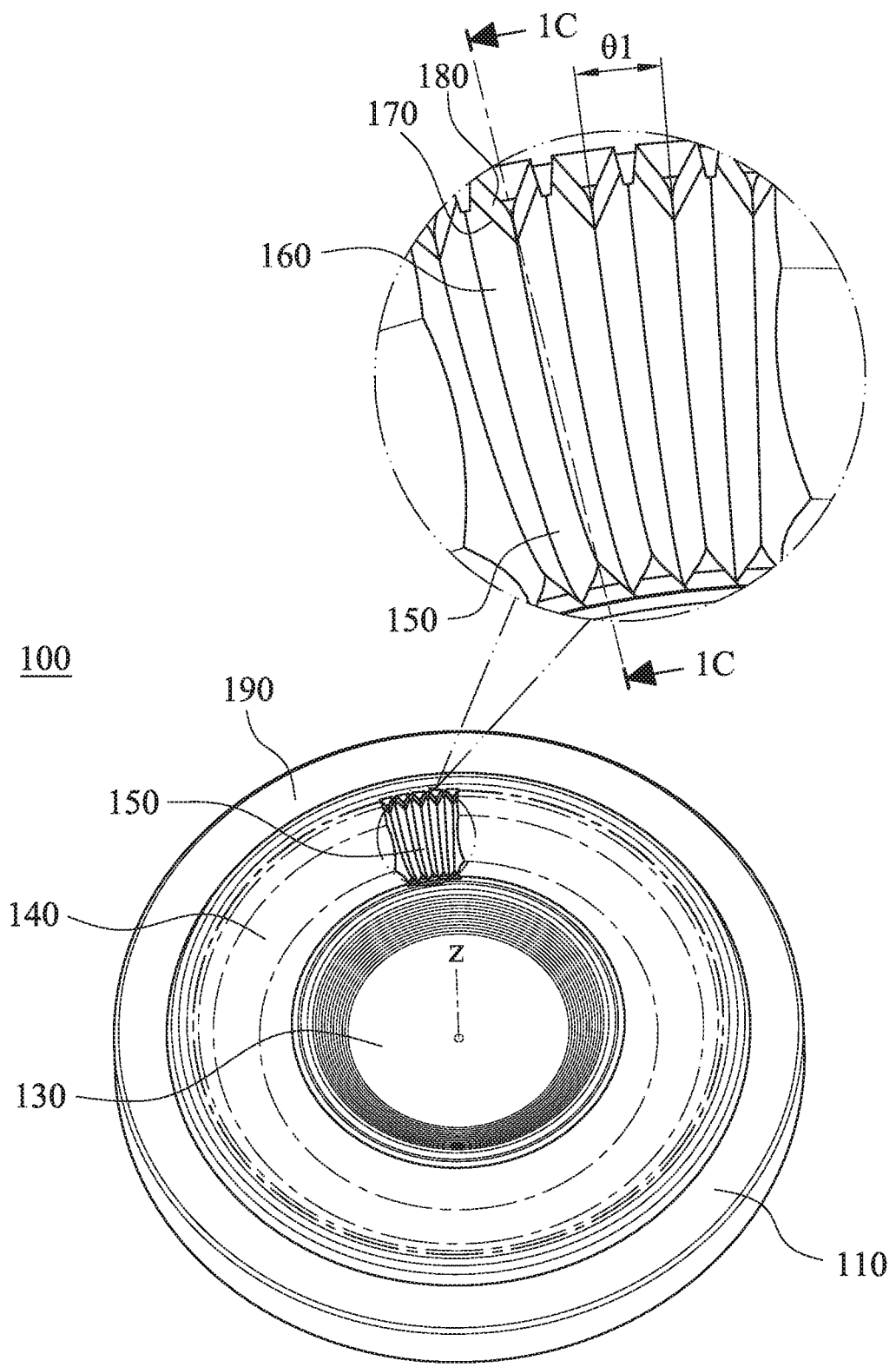
FIG. 1A is a three-dimensional view of a plastic lens element according to the 1st embodiment of the present disclosure.

FIG. 1A is a three-dimensional view of a plastic lens element 100 according to the 1st embodiment of the present disclosure. In FIG. 1A, the plastic lens element 100 includes an optical effective portion 130 and a lens peripheral portion 140 in order from a central axis z to an edge of the plastic lens element 100. The lens peripheral portion 140 surrounds the optical effective portion 130 and includes a plurality of curve-shaped strip structures 150. Specifically, the lens peripheral portion 140 Includes the curve-shaped strip structures 150, which are located on an object-side surface 110 of the plastic lens element 100, When the plastic lens element 100 is applied in the lens module (not shown herein), the object-side surface 110 faces an imaged object (not shown herein), and an image-side surface 112 of the plastic lens element 100 faces an image surface (not shown herein). In the 1st embodiment, the object-side surface 110 includes an abutting surface 190 for abutting with one of a plurality of optical elements of the lens module.

Figure 1B:
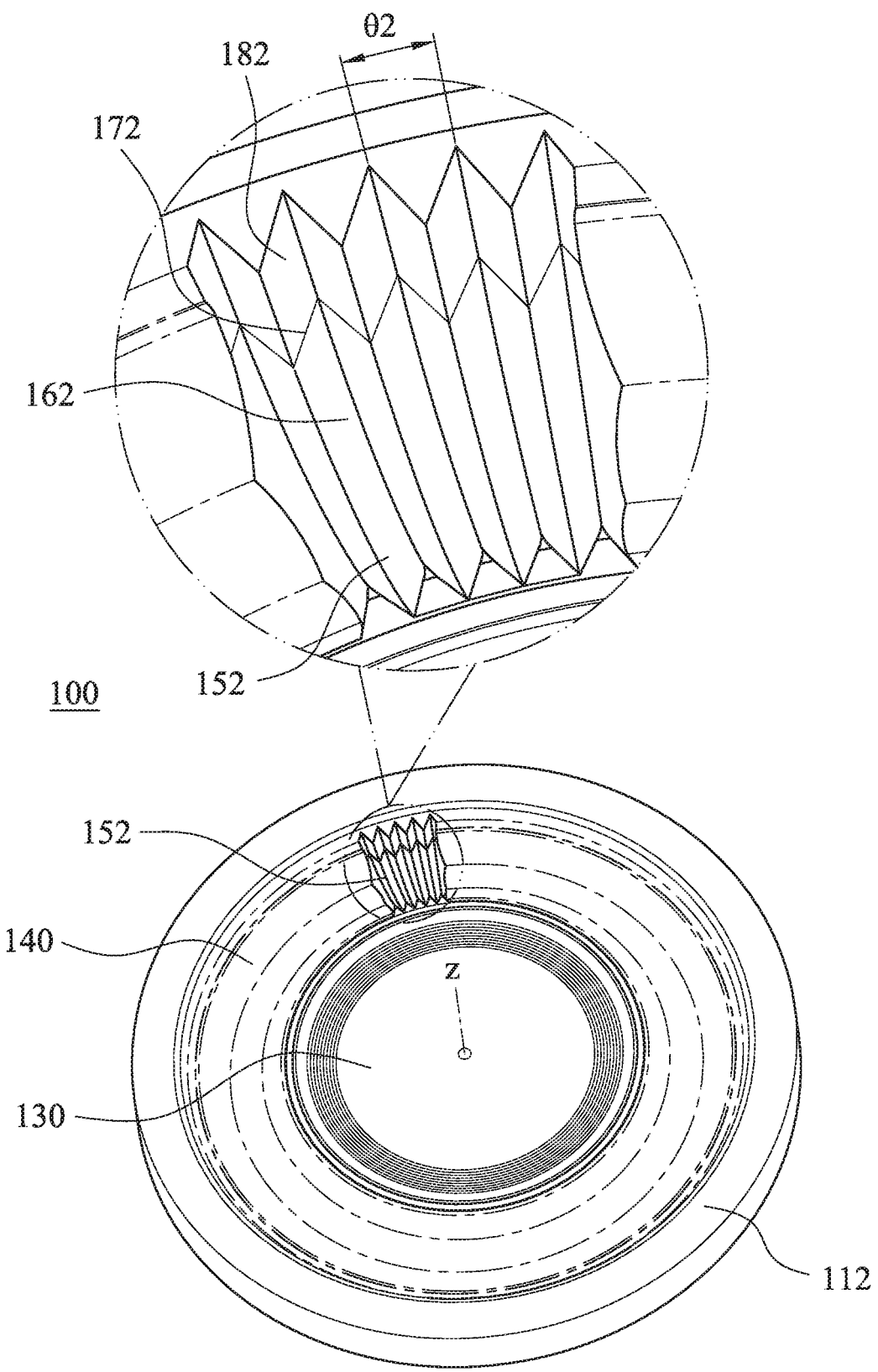
FIG. 1B is another three-dimensional view of the plastic lens element according to the 1st embodiment.
Figure 1C:
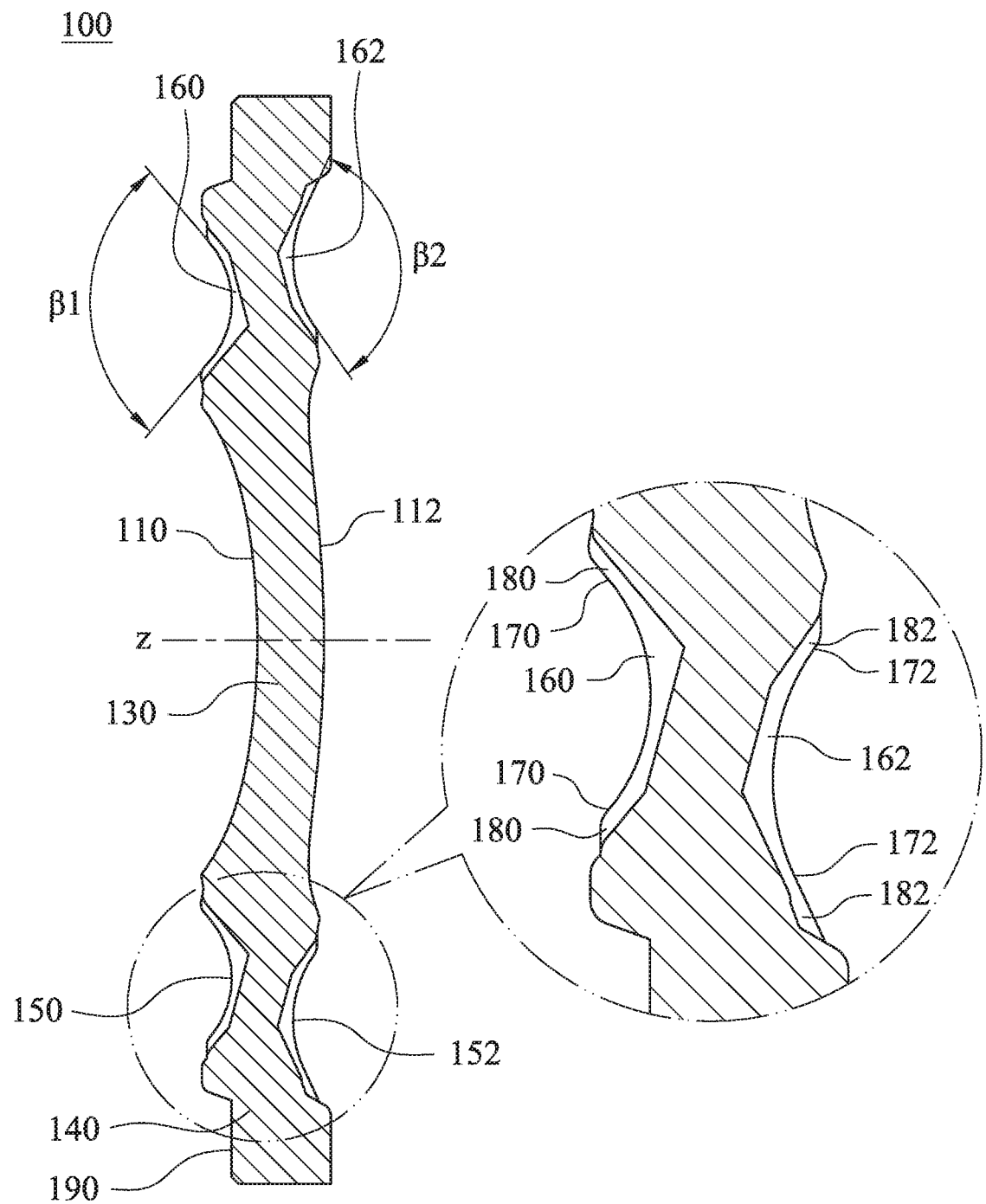
FIG. 1C is a cross-sectional view along line 1C-1C of FIG. 1A.

FIG. 1B is another three-dimensional view of the plastic lens element 100 according to the 1st embodiment. FIG. 1C is a cross-sectional view along line 1C-1C of FIG. 1A, wherein FIG. 1C shows a cross-sectional plane along a most protruding surface of each of the curve-shaped strip structures 150, which is parallel to a radial direction of the central axis z (the most protruding surface is in a longitudinal direction of each of the curve-shaped strip structures 150), and FIG. 1C is also a longitudinal cross-sectional view of each of the curve-shaped strip structures 150. In FIG. 1A to FIG. 1C, each of the curve-shaped strip structures 150 is located and extended along the radial direction of the central axis z, and each of the curve-shaped strip structures 150 is curved in a concave form. That is, each single of the curve-shaped strip structures 150 is curved in the concave form, which is extended along a corresponding radial direction with respect to the central axis z. The curve-shaped strip structures 150 are prearranged in a circumferential direction of the central axis z and around the optical effective portion 130. The curve-shaped strip structures 150 are not directly connected to the optical effective portion 130. Therefore, each of the curve-shaped strip structures 150 being curved in the concave form is advantageous in reducing the shrinkage degrees and the shrinkage unevenness of the plastic lens element 100 in a sheet shape after an injection molding process, so as to maintain the optical effective portion 130 with a superior quality.

Specifically, every one of the curve-shaped strip structures 150 has the same structure and shape. In addition, every one of a plurality of curve-shaped strip structures of a plastic lens element (not shown herein) according to the present disclosure may not have exactly the same structure and shape.

Furthermore, "the radial direction of the central axis" described in the present disclosure indicates a direction located on a plane within a lens peripheral portion, wherein a part of a single one of the curve-shaped strip structures is located on the plane. On the plane, "the radial direction of the central axis" is vertical to the circumferential direction of the central axis. Thus, "the radial direction of the central axis" may be vertical to the central axis, or may not be vertical to the central axis (as each of the curve-shaped strip structures 150 in the 1st embodiment).

Moreover, each of the curve-shaped strip structures being curved in the concave form indicates that an entirety of each of the curve-shaped strip structures is curved in the concave form along the radial direction of the central axis. That is, the entirety of each of the curve-shaped strip structures has a concave curve along the radial direction of the central axis. Unless otherwise described, the structural features of each of the curve-shaped strip structures described in the present disclosure indicate those along the radial direction of the central axis of each of the curve-shaped strip structures, for example, as shown in FIG. 1C. FIG. 1C shows the cross-sectional plane along the most protruding surface of each of the curve-shaped strip structures 150, which is parallel to the radial direction of the central axis z (the most protruding surface is in the longitudinal direction of each of the curve-shaped strip structures 150).

On the cross-sectional plane along the radial direction of the central axis, a surface of each of the curve-shaped strip structures according to the present disclosure is continuous, that is, the surface of each of the curve-shaped strip structures satisfies the continuity of the continuous function in the field of mathematics. Specifically, on the cross-sectional plane along the radial direction of the central axis, the surface of each of the curve-shaped strip structures may be composed of a concave surface, wherein every position on the concave surface has the curvature radius being the same or changed continuously. The surface of each of the curve-shaped strip structures may be composed of at least one concave surface and at least one surface of planar surfaces and convex surfaces, wherein every position on the concave surface and the convex surface has the curvature radius being the same or changed continuously, an inflection point between the concave surface and the planar surface is continuous, an inflection point between the concave surface and the convex surface is continuous, and an inflection point between the planar surface and the convex surface is continuous. In addition, the concave surface indicates that a curvature center of any position on the concave surface is located outside the any position, the planar surface indicates that a curvature center of any position on the planar surface is substantially Located at infinity, and the convex surface indicates that a curvature center of any position on the convex surface is located inside the any position. The inflection points indicate a connection between the concave surface and the planar surface, a connection between the concave surface and the convex surface, and a connection between the planar surface and the convex surface.

In the 1st embodiment, on the cross-sectional plane along the radial direction of the central axis z, as shown in FIG. 1C for example, the surface of each of the curve-shaped strip structures 150 is continuous, and each of the curve-shaped strip structures 150 is curved in the concave form. The surface of each of the curve-shaped strip structures 150 along the radial direction of the central axis z is composed of a concave surface (i.e. the concave curve portion 160) and two planar surfaces (i.e. two inverse curve structures 180), wherein two ends of the concave surface respectively connects the two planar surfaces. The surface of each of the curve-shaped strip structures 150 along the radial direction of the central axis z is continuous. Specifically, every position on the concave surface of each of the curve-shaped strip structures 150 has the curvature radius being the same, every position on the planar surfaces thereof has the curvature radius being the same (infinity), and each of two inflection points 170 between the concave surface and the planar surfaces respectively is continuous.

Specifically, in FIG. 1B and FIG. 1C, the lens peripheral portion 140 further includes a plurality of curve-shaped strip structures 152, wherein the lens peripheral portion 140 includes the curve-shaped strip structures 152, which are located on the image-side surface 112. FIG. 1C shows a cross-sectional plane along a most protruding surface of each of the curve-shaped strip structures 152, which is parallel to the radial direction of the central axis z (the most protruding surface is in a longitudinal direction of each of the curve-shaped strip structures 152), and FIG. 1C is also a longitudinal cross-sectional view of each of the curve-shaped strip structures 152. Each of the curve-shaped strip structures 152 is located and extended along the radial direction of the central axis z, and each of the curve-shaped strip structures 152 is curved in a concave form. That is, each single of the curve-shaped strip structures 152 is curved in the concave form, which is extended along a corresponding radial direction with respect to the central axis z. The curve-shaped strip structures 152 are prearranged in the circumferential direction of the central axis z and around the optical effective portion 130. The curve-shaped strip structures 152 are not directly connected to the optical effective portion 130. Therefore, the curve-shaped strip structures 150 and 152 being both curved in the concave forms are further advantageous in reducing the shrinkage degrees and the shrinkage unevenness of the plastic lens element 100 in the sheet shape after the injection molding process, so as to maintain the optical effective portion 130 with the superior quality. In addition, on the cross-sectional plane along the radial direction of the central axis z, as shown in FIG. 1C for example, a surface of each of the curve-shaped strip structures 152 is continuous. The surface of each of the curve-shaped strip structures 152 along the radial direction of the central axis z is composed of a concave surface (i.e. a concave curve portion 162) and two planar surfaces (i.e. two inverse curve structures 182), wherein two ends of the concave surface respectively connects the two planar surfaces. The surface of each of the curve-shaped strip structures 152 along the radial direction of the central axis z is continuous. Specifically, every position on the concave surface of each of the curve-shaped strip structures 152 has the curvature radius being the same, every position on the planar surfaces thereof has the curvature radius being the same, and each of two inflection points 172 between the concave surface and the planar surfaces respectively is continuous. Moreover, every one of the curve-shaped strip structures 152 has the same structure and shape. In other embodiments according to the present disclosure (not shown herein), only one of an object-side surface and an image-side surface of a plastic lens element includes a plurality of curve-shaped strip structures.

On the cross-sectional plane along the radial direction of the central axis z, as shown in FIG. 1C for example, each of the curve-shaped strip structures 150 may include the concave curve portion 160. When an angle between two tangential directions of two ends respectively of the concave curve portion 160 is $\beta 1$, the following condition may be satisfied: 90 degrees<$\beta 1$<170 degrees. Each of the curve-shaped strip structures 152 may include the concave curve portion 162. When an angle between two tangential directions of two ends respectively of the concave curve portion 162 is $\beta 2$, the following condition may be satisfied: 90 degrees<$\beta 2$<170 degrees. Therefore, an entirety of each structure of the curve-shaped strip structures 150 and 152 being featured with a curved design is advantageous in corresponding to the requirement of the narrow runner in the injection molding process and providing a proper structural strength of the plastic lens element 100 being a thin lens element. Furthermore, parameters $\beta 1$ and $\beta 2$ in the 1st embodiment are consistent with the definition of the parameter $\beta$ in the claims of the present disclosure. The two ends of the concave curve portion 160 are the two inflection points 170 respectively, and the two ends of the concave curve portion 162 are the two inflection points 172 respectively.

Specifically, a concave curve portion of each of the curve-shaped strip structures of a plastic lens element according to the present disclosure may be a concave surface, wherein every position on the concave curve portion (the concave surface) has the curvature radius being the same or changed continuously. In the 1st embodiment, the concave curve portion 160 of each of the curve-shaped strip structures 150 is a concave surface, wherein every position on the concave curve portion 160 (the concave surface) has the curvature radius being the same. The concave curve portion 162 of each of the curve-shaped strip structures 152 is a concave surface, wherein every position on the concave curve portion 162 (the concave surface) has the curvature radius being the same.

In FIG. 1A to FIG. 1C, each of the curve-shaped strip structures 150 may include the at least one inverse curve structure 180, and each of the curve-shaped strip structures 152 may include the at least one inverse curve structure 182. Therefore, it is favorable for the curve-shaped strip structures 150 and 152 to properly surround the optical effective portion 130 and not to be directly connected to the optical effective portion 130 so as to maintain the molding quality of the plastic lens element 100.

According to the present disclosure, each of the curve-shaped strip structures of a plastic lens element is curved in a concave form. On the cross-sectional plane along the radial direction of the central axis, each of the curve-shaped strip structures includes a concave surface specifically, wherein an inverse curve structure may be a planar surface, and an inflection point between the concave surface and the inverse curve structure (the planar surface) is continuous. The inverse curve structure may be a convex surface, every position on the inverse curve structure (the convex surface) has the curvature radius being the same or changed continuously, and an inflection point between the concave surface and the inverse curve structure (the convex surface) is continuous. Furthermore, each of the curve-shaped strip structures may include at least two inflection points. Each of the curve-shaped strip structures may have a change from a concave surface to a planar surface, then to another concave surface, or a change from a concave surface to a convex surface, then to another concave surface, but not limited thereto. The another concave surface is also an inverse curve structure, thus an inverse curve structure may be another concave surface. In addition, another concave surface may be deemed to a concave curve portion of a plastic lens element according to the present disclosure. In the 1st embodiment, each of the curve-shaped strip structures 150 includes the two inverse curve structures 180, which are planar surfaces, and the two inflection points 170 between the concave curve portion 160 and the two inverse curve structures 180 respectively are both continuous. Each of the curve-shaped strip structures 152 includes the two inverse curve structures 182, which are planar surfaces, and the two inflection points 172 between the concave curve portion 162 and the two inverse curve structures 182 respectively are both continuous. Therefore, the two inverse curve structures 180 is advantageous in flatting two ends of each of the curve-shaped strip structures 150, the two inverse curve structures 182 is advantageous in flatting two ends of each of the curve-shaped strip structures 152, and thereby it matches the appearance of the plastic lens element 100.

Figure 1D:
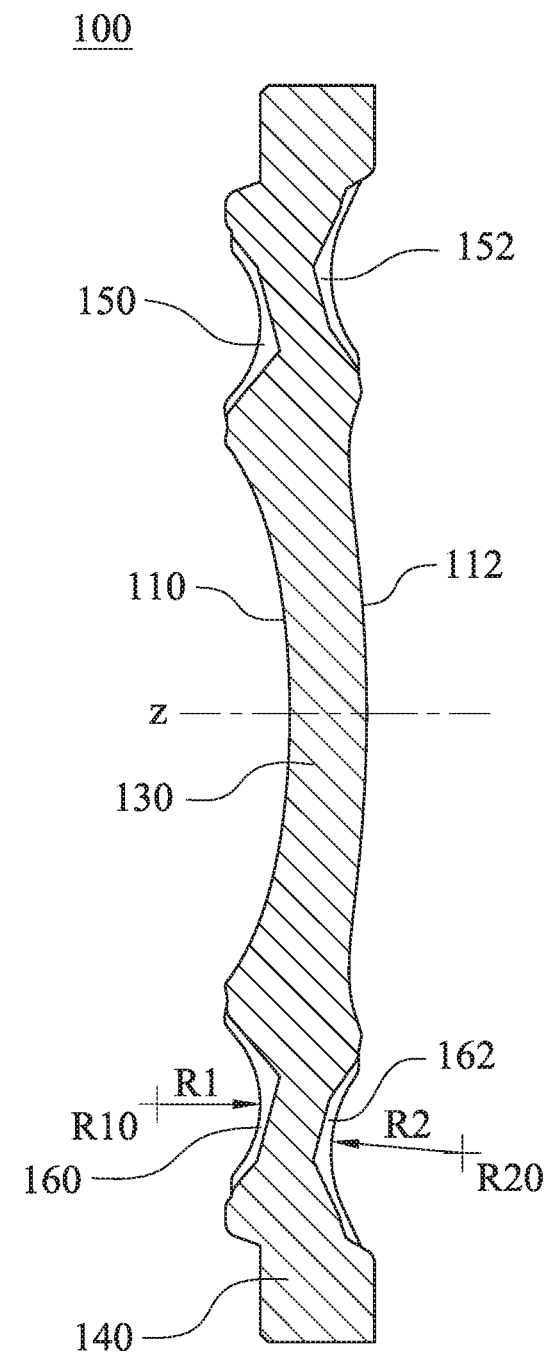
FIG. 1D is a schematic view of the parameters of the plastic lens element according to the 1st embodiment.
Figure 1E:
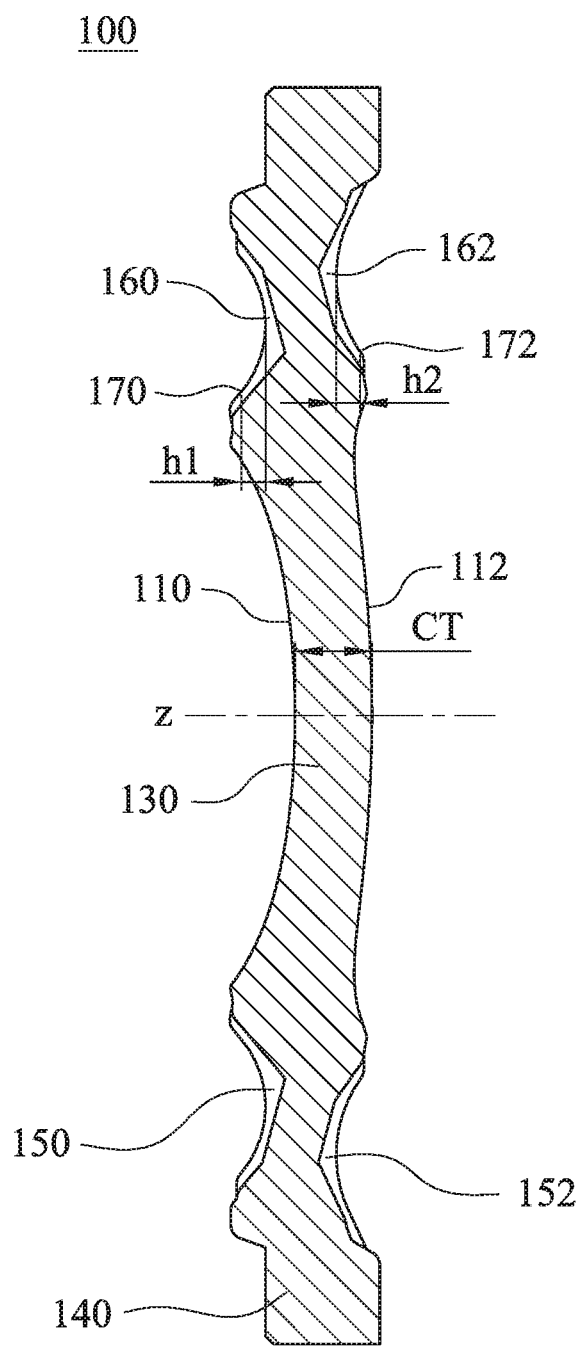
FIG. 1E is another schematic view of the parameters of the plastic lens element according to the 1st embodiment.

FIG. 1D is a schematic view of the parameters of the plastic lens element 100 according to the 1st embodiment, and FIG. 1E is another schematic view of the parameters of the plastic lens element 100 according to the 1st embodiment. Each of FIG. 1D and FIG. 1E is also the cross-sectional view along line 1C-1C of FIG. 1A, as FIG. 1C. On the cross-sectional plane along the radial direction of the central axis z, as shown in FIG. 1E for example, each of the curve-shaped strip structures 150 includes the concave curve portion 160 and the two inflection points 170, wherein each of the inflection points 170 connects the concave curve portion 160 and a corresponding one of the inverse curve structures 180. When a greatest depth (a greatest distance) parallel to the central axis z between at least one of the inflection points 170 and the concave curve portion 160 is h1, the following condition may be satisfied: 0.05 mm<h1<0.35 mm. Each of the curve-shaped strip structures 152 includes the concave curve portion 162 and the two inflection points 172, wherein each of the inflection points 172 connects the concave curve portion 162 and a corresponding one of the inverse curve structures 182. When a greatest depth (a greatest distance) parallel to the central axis z between at least one of the inflection points 172 and the concave curve portion 162 is h2, the following condition may be satisfied: 0.05 mm<h2<0.35 mm. Furthermore, parameters h1 and h2 in the 1st embodiment are consistent with the definition of the parameter h in the claims of the present disclosure. Each of the curve-shaped strip structures being curved in a concave form easily deforms and warps after molding when a greatest depth h1 or h2 thereof is too deep. Fine lines would be increased on the surface of a thin lens element due to the design purposes of the injection gate of the narrow runner therefor being not achieved when a greatest depth h1 or h2 thereof is too small. The plastic lens element 100 with the greatest depth h1 or h2 satisfying the aforementioned ranges is beneficial for effectively reducing the problems of deformation and warpage of each structure of the curve-shaped strip structures 150 and 152, as well as decreasing fine lines on the plastic lens element 100.

When the greatest depth (the greatest distance) parallel to the central axis z between at least one of the inflection points 170 and the concave curve w portion 160 is h1, and a central thickness of the plastic lens element 100 is CT, the following condition may be satisfied: 0.05 mm<h1<CT. When the greatest depth (the greatest distance) parallel to the central axis z between at least one of the inflection points 172 and the concave curve portion 162 is h2, and the central thickness of the plastic lens element 100 is CT, the following condition may be satisfied: 0.05 mm<h2<CT. Furthermore, the central thickness CT of the plastic lens element 100 is a thickness corresponding to the central axis z of the optical effective portion 130, and parameters h1 and h2 in the 1st embodiment are consistent with the definition of the parameter h in the claims of the present disclosure. Therefore, it is favorable for avoiding being too deeply curved in the concave form so as to maintain an even thickness of the plastic lens element 100.

The plastic lens element 100 including the curve-shaped strip structures 150 and 152 may be formed integrally. Therefore, it is favorable for the plastic lens element 100 to be manufactured by an injection molding method so as to increase the production efficiency. In other embodiments (not shown in drawings) according to the present disclosure, a plastic lens element may be made by other methods, such as machining, 3D printing or other molding methods, but not limited thereto.

On the cross-sectional plane along the radial direction of the central axis z, as shown in FIG. 1C for example, each of the curve-shaped strip structures 150 includes the concave curve portion 160, and the concave curve portion 160 is a conic section. Each of the curve-shaped strip structures 152 includes the concave curve portion 162, and the concave curve portion 162 is a conic section. Therefore, the concave curve portions 160 and 162 featured with smooth lines respectively are advantageous in avoiding the overly complex appearance of the plastic lens element 100 so as to control the dimensional stability thereof.

Specifically, on the cross-sectional plane along the radial direction of the central axis, a concave curve portion of each of the curve-shaped strip structures according to the present disclosure may be at least a part of a conic section. That is, the concave curve portion may be at least a part of one kind of a circle, an ellipse, a parabola, a hyperbola and a straight line, wherein every position on the concave curve portion has the curvature radius being the same or changed continuously. In addition, when a part of the concave curve portion is a straight line. It may indicate that an extremely small part close to the inflection point approaches a straight line.

In the 1st embodiment, on the cross-sectional plane along the radial direction of the central axis z, as shown in FIG. 1D for example, the concave curve portions 160 and 162 are the conic sections, wherein each of the concave curve portions 160 and 162 is a part of a circle.

The following Equation (1.1) is an equation of a conic section being two-dimensional, wherein X and Y represent a Cartesian coordinate system of a two-dimensional plane, and A1, A2 and B1 are coefficients of the equation of the conic section being two-dimensional. The values of coefficients A1, A2 and B1 depend on the Cartesian coordinate system being used, and the relationship among the values of coefficients A1, A2 and B1 determines the conic section is a circle, an ellipse, a parabola, a hyperbola or a straight line. Following Equation (1.2) is a discriminant of the equation of the conic section being two-dimensional (i.e. Equation (1.1)). For example, when the relationship among the values of coefficients A1, A2 and B1 satisfies $\delta>0$ and A1=A2, the conic section is a circle. When the relationship among the values of coefficients A1, A2 and B1 satisfies other conditions, the conic section is an ellipse, a parabola, a hyperbola or a straight line, and the detailed descriptions are omitted herein.

$$A1 \times X^2 + A2 \times Y^2 + 2 \times B1 \times X \times Y = 0 \quad \text{Equation (1.1)}$$

$$\delta = \begin{bmatrix} A1 & B1 \\ B1 & A2 \end{bmatrix} \quad \text{Equation (1.2)}$$

The appearances being curved in the concave forms of the curve-shaped strip structures 150 and 152 are respectively contributed by the concave curve portions 160 and 162 as the conic sections, wherein each of the concave curve portions 160 and 162 satisfies the condition being a circle of the discriminant of the equation of the conic section. It is favorable for the plastic lens element 100 as a thin lens element and with the optical effective portion 130 being great dimension to provide further effective solutions. The machining process of the molds for the curve-shaped strip structures 150 and 152, which is different from chamfering in the conventional machining process, would be further successive. It is also favorable for a better structural quality of a V-shaped groove between adjacent two structures of each of the curve-shaped strip structures 150 and 152 after molding, and thereby increasing the production efficiency of the plastic lens element 100.

On the cross-sectional plane along the radial direction of the central axis z, as shown in FIG. 1D for example, each of the curve-shaped strip structures 150 includes the concave curve portion 160. When the curvature radius of the concave curve portion 160 is R1, the following condition may be satisfied: 0.02 mm<R1<2.0 mm, Each of the curve-shaped strip structures 152 includes the concave curve portion 162. When the curvature radius of the concave curve portion 162 is R2, the following condition may be satisfied: 0.02 mm<R2<2.0 mm. Therefore, the plastic lens element 100 with the curvature radii R1 or R2 satisfying the aforementioned ranges is beneficial for effectively controlling the shrinkage of the plastic lens element 100 after molding. In detail, the curve-shaped strip structures 150 and 152 are in charge of more proportion of the shrinkage of the plastic lens element 100, and thereby the shrinkage of the plastic lens element 100 has less impact on the optical effective portion 130. Furthermore, parameters R1 and R2 in the 1st embodiment are consistent with the definition of the parameter R in the claims of the present disclosure. In addition, each of the concave curve portions 160 and 162 is a part of a circle. Thus, every position on the concave curve portion 160 has the curvature radius R1 being the same, and a curvature center R10 of every position on the concave curve portion 160 is shown in FIG. 1D. Every position on the concave curve portion 162 has the curvature radius R2 being the same, and a curvature center R20 of every position on the concave curve portion 162 is shown in FIG. 1D.

In FIG. 1A and FIG. 1B, when an angle with respect to the central axis z between any adjacent two of the curve-shaped strip structures 150 is $\theta 1$, the following condition may be satisfied: 0 degrees<$\theta 1$<5 degrees. That is, $\theta 1$ is a center-to-center spacing angle in the circumferential direction of the central axis z between any adjacent two of the curve-shaped strip structures 150. When an angle with respect to the central axis z between any adjacent two of the curve-shaped strip structures 152 is $\theta 2$, the following condition may be satisfied: 0 degrees<$\theta 2$<5 degrees. That is, $\theta 2$ is a center-to-center spacing angle in the circumferential direction of the central axis z between any adjacent two of the curve-shaped strip structures 152. Therefore, the plastic lens element 100 having the arrangement of the proper center-to-center spacing angles is advantageous in preventing each structure of the curve-shaped strip structures 150 and 152 from being overly narrow and abnormally pressed, and from being overly wide and warped. Furthermore, parameters $\theta 1$ and $\theta 2$ in the 1st embodiment are consistent with the definition of the parameter $\theta$ in the claims of the present disclosure.

A number of the curve-shaped strip structures 150 may be greater than or equal to 105, and smaller than or equal to 380. A number of the curve-shaped strip structures 152 may be greater than or equal to 105, and smaller than or equal to 380. Therefore, the curve-shaped strip structures 150 and 152 being densely arranged are advantageous in effectively reducing the stray light reflection of the plastic lens element 100.

In the 1st embodiment, the angle $\theta 1$ with respect to the central axis z between any adjacent two of the curve-shaped strip structures 150 is 1.5 degrees, and the number of the curve-shaped strip structures 150 is 240. The angle $\theta 2$ with respect to the central axis z between any adjacent two of the curve-shaped strip structures 152 is 1.5 degrees, and the number of the curve-shaped strip structures 152 is 240.

In FIG. 1A and FIG. 1B, a transverse cross-sectional plane of each of the curve-shaped strip structures 150 may be triangular, wherein the transverse cross-sectional plane of each of the curve-shaped strip structures 150 is a cross-sectional plane thereof along the circumferential direction of the central axis z. A transverse cross-sectional plane of each of the curve-shaped strip structures 152 may be triangular, wherein the transverse cross-sectional plane of each of the curve-shaped strip structures 152 is a cross-sectional plane thereof along the circumferential direction of the central axis z. Therefore, it is favorable for the mold release step of the injection molding process for the plastic lens element 100. In the 1st embodiment, the transverse cross-sectional plane of each structure of the curve-shaped strip structures 150 and 152 is isosceles triangular, shown as an end closer to the central axis z of each of the curve-shaped strip structures 150 in the enlarged view in FIG. 1A, and as an end closer to the central axis z of each of the curve-shaped strip structures 152 in the enlarged view in FIG. 1B. In addition, a structure between adjacent two of the curve-shaped strip structures 150 and a structure between adjacent two of the curve-shaped strip structures 152 are shown as FIG. 1A to FIG. 1C, and may be adjusted as needed. In other embodiments according to the present disclosure (not shown in drawings), a transverse cross-sectional plane of each of the curve-shaped strip structures may be rectangular, wedge-shaped, but not limited thereto.

The plastic lens element 100 may be made by the injection molding method. When an injection molding shrinkage rate of the plastic lens element 100 is S, the following condition may be satisfied: 0.05%<S<1.4%. Therefore, it is favorable for reducing the warpage occurrences resulted from abnormal shrinkage of the curve-shaped strip structures 150 and 152. Furthermore, an injection molding shrinkage rate S of a plastic lens element according to the present disclosure indicates an injection molding shrinkage rate of a plastic material of the plastic lens element. In the 1st embodiment, the plastic lens element 100 is made of a polycarbonate (PC) material being transparent. More specifically, the polycarbonate material is EP series from the manufacturer MGC.

The following Table 1.1 lists injection molding shrinkage rates of several plastic materials. The polycarbonate material is commonly used in the field of the lens modules, wherein an injection molding shrinkage rate thereof is about 0.6%-0.8%, such as EP series from the manufacturer MGC, and SP series and L-1225Y series of the manufacturer Teijin. The cyclic olefin copolymer (COC) material and the cyclic olefin polymer (COP) material are also commonly used in the field of the lens modules, wherein an injection molding shrinkage rate thereof is about 0.6%-0.7%, such as COC and COP series from the manufacturer TOPAS Advanced Polymers.

TABLE 1.1

Injection molding shrinkage rates of plastic materials

| Plastic materials | | Injection molding shrinkage rates |
|---|---|---|
| Polystyrene | (PS) | 0.3%~0.6% |
| Acrylonitrile butadiene styrene | (ABS) | 0.4%~0.7% |
| Poly(methyl methacrylate) | (PMMA) | 0.1%~0.8% |
| Polycarbonate | (PC) | 0.6%~0.8% |
| Cyclic olefin copolymer | (COC) | 0.6%~0.7% |
| Cyclic olefin polymer | (COP) | 0.6%~0.7% |
| Polypropylene | (PP) | 1.0%~2.5% |
| Polyoxymethylene | (POM) | 1.9%~2.3% |
| Polyethylene terephthalate | (PET) | 1.2%~2.0% |
| Polyethylene (high density) | (PE) | 1.5%~3.0% |

The data of the aforementioned parameters of the plastic lens element 100 according to the 1st embodiment of the present disclosure are listed in the following Table 1.2, wherein the parameters are also shown as FIG. 1A to FIG. 1E.

TABLE 1.2

| 1st embodiment | | | |
|---|---|---|---|
| β1 (deg.) | 100 | R1 (mm) | 0.47 |
| β2 (deg.) | 120 | R2 (mm) | 0.37 |
| h1 (mm) | 0.0866 | θ1 (deg.) | 1.5 |
| h2 (mm) | 0.085 | θ2 (deg.) | 1.5 |
| CT (mm) | 0.275 | S | 0.6%~0.8% |

2nd Embodiment

Figure 2A:
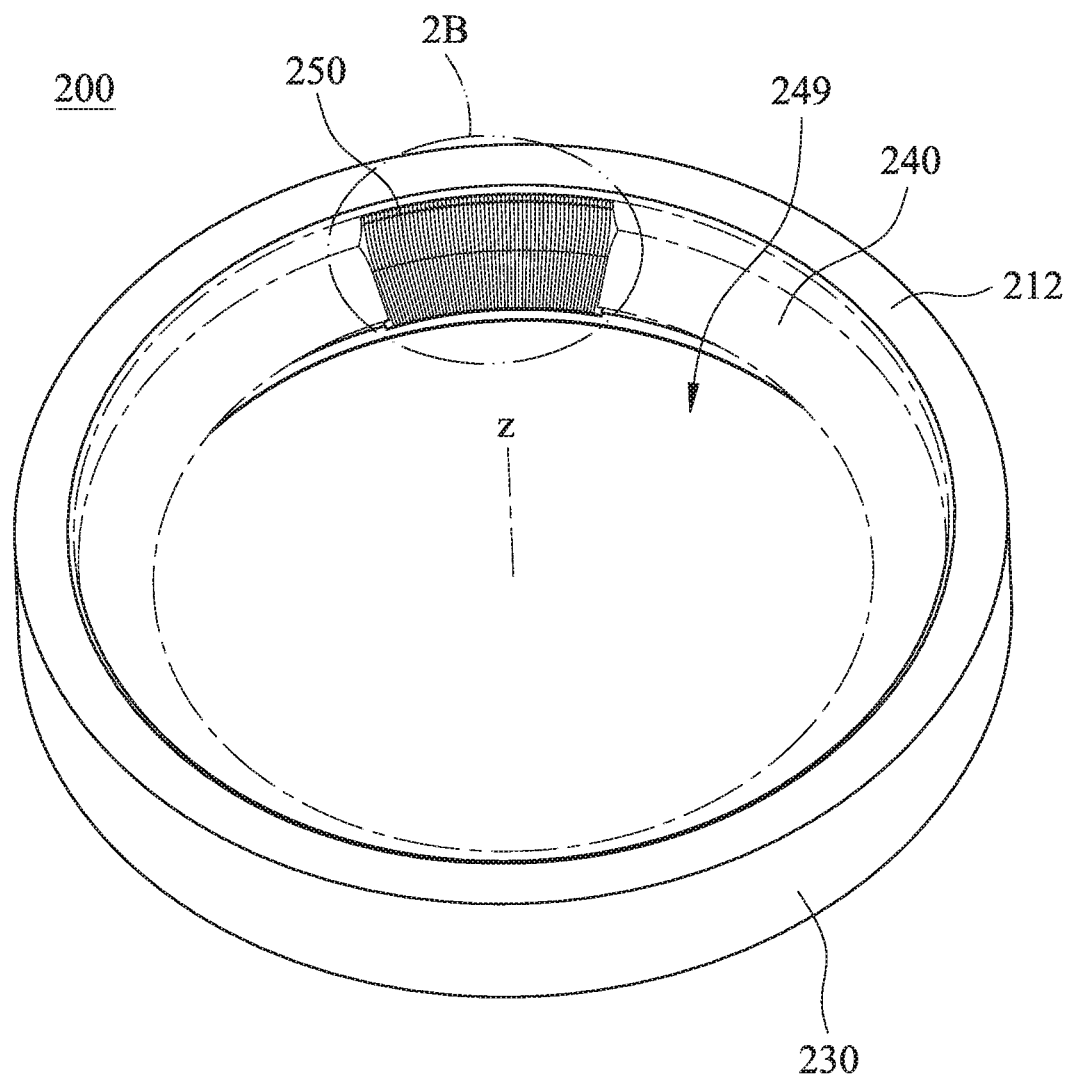
FIG. 2A is a three-dimensional view of a plastic annular optical element according to the 2nd embodiment of the present disclosure.

FIG. 2A is a three-dimensional view of a plastic annular optical element 200 according to the 2nd embodiment of the present disclosure. In FIG. 2A, the plastic annular optical element 200 includes an outer diameter surface 230 and an inner annular surface 240. The outer diameter surface 230 surrounds a central axis z of the plastic annular optical element 200. The inner annular surface 240 surrounds the central axis z and forms a central hole 249. The inner annular surface 240 includes a plurality of curve-shaped strip structures 250. In addition, the plastic annular optical element 200 further includes an object-side surface 210 and an image-side surface 212. When the plastic annular optical element 200 is applied in a tens module (not shown herein), the object-side surface 210 faces an imaged object (not shown herein), and the image-side surface 212 faces an image surface (not shown herein).

A plastic annular optical element according to the present disclosure may be a spacer, a retainer, a lens barrel and so on, but not limited thereto. In the 2nd embodiment, the plastic annular optical element 200 is a spacer.

Figure 2B:
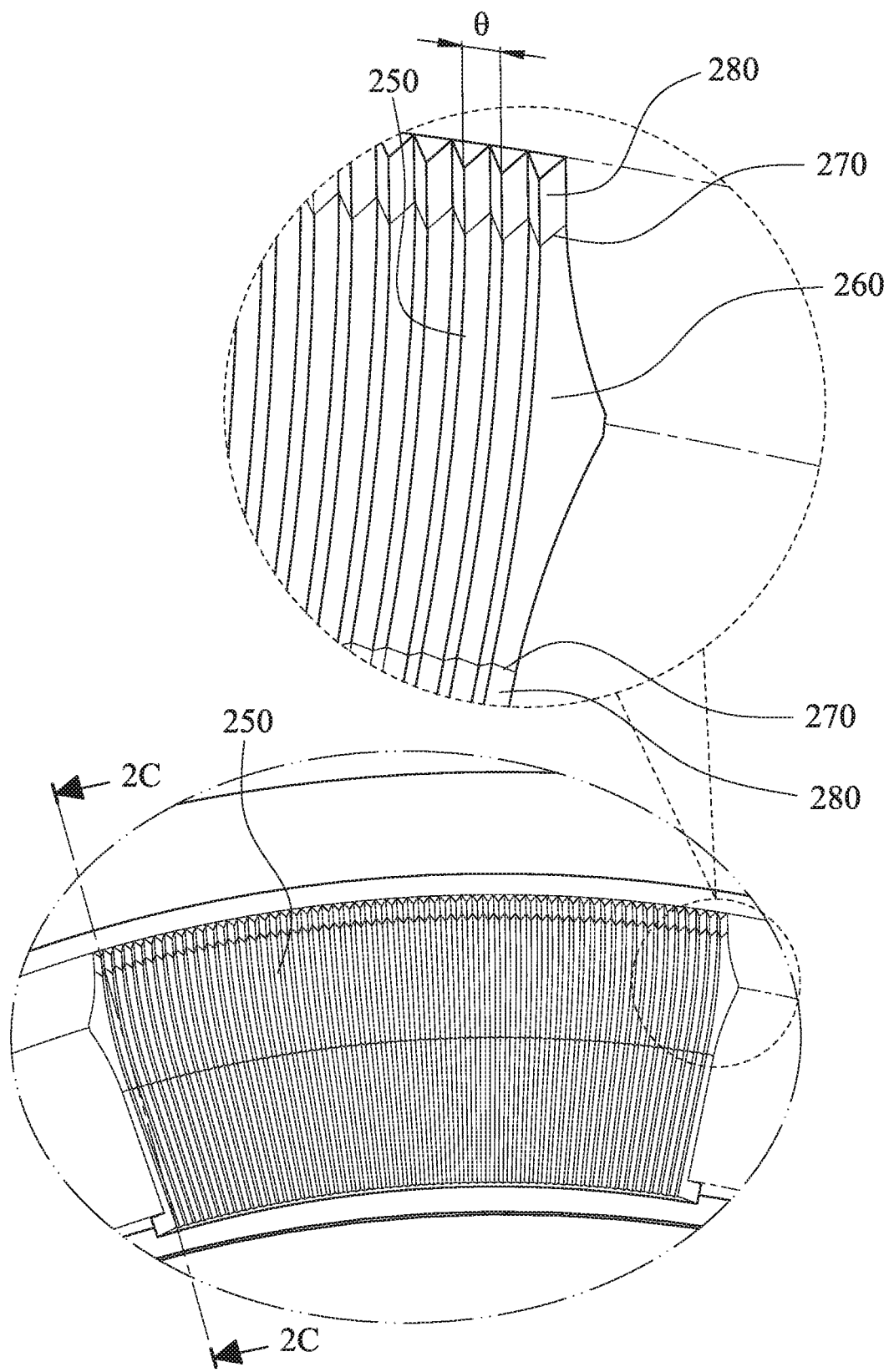
FIG. 2B is an enlarged view of part 2B in FIG. 2A.
Figure 2C:
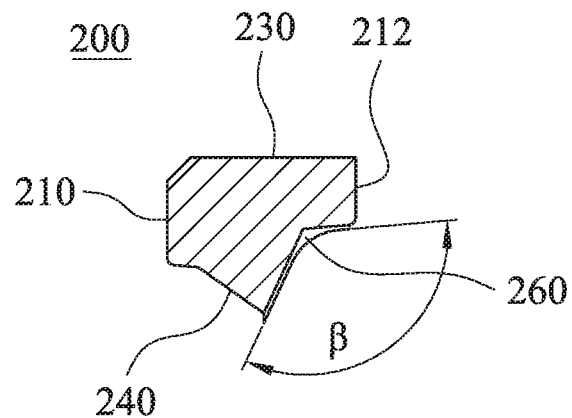
FIG. 2C is a cross-sectional view along line 2C-2C of FIG. 2B.
Figure 2C:
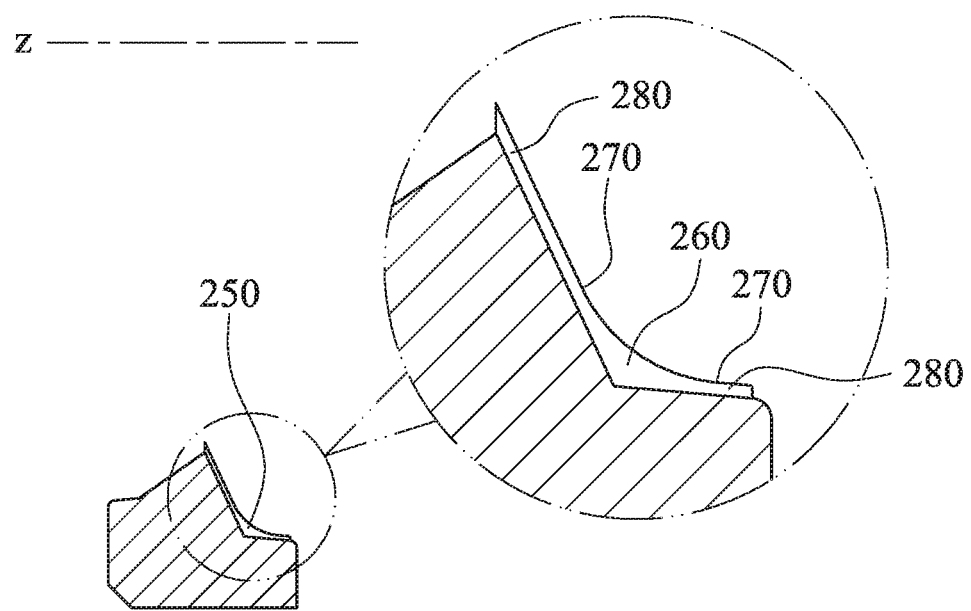

FIG. 2B is an enlarged view of part 2B in FIG. 2A. FIG. 2C is a cross-sectional view along line 2C-2C of FIG. 2B, wherein FIG. 2C shows a cross-sectional plane along a most protruding surface of each of the curve-shaped strip structures 250, which is parallel to a radial direction of the central axis z (the most protruding surface is in a longitudinal direction of each of the curve-shaped strip structures 250), and FIG. 2C is also a longitudinal cross-sectional view of each of the curve-shaped strip structures 250, In FIG. 2A to FIG. 2C, each of the curve-shaped strip structures 250 is located and extended along the radial direction of the central axis z, and each of the curve-shaped strip structures 250 is curved in a concave form. That is, each single of the curve-shaped strip structures 250 is curved in the concave form, which is extended along a corresponding radial direction with respect to the central axis z. The curve-shaped strip structures 250 are prearranged in a circumferential direction of the central axis z and around the central hole 249. Therefore, each of the curve-shaped strip structures 250 curved in the concave form is advantageous in increasing the structural strength and maintaining a better roundness of the plastic annular optical element 200 after injection molding.

Specifically, every one of the curve-shaped strip structures 250 has the same structure and shape. In addition, every one of a plurality of curve-shaped strip structures of a plastic annular optical element (not shown herein) according to the present disclosure may not have exactly the same structure and shape.

In the 2nd embodiment, on the cross-sectional plane along the radial direction of the central axis z, as shown in FIG. 2C for example, the surface of each of the curve-shaped strip structures 250 is continuous, and each of the curve-shaped strip structures 250 is curved in the concave form. The surface of each of the curve-shaped strip structures 250 along the radial direction of the central axis z is composed of a concave surface (i.e. a concave curve portion 260) and two planar surfaces (i.e. two inverse curve structures 280), wherein two ends of the concave surface respectively connects the two planar surfaces. The surface of each of the curve-shaped strip structures 250 along the radial direction of the central axis z is continuous. Specifically, every position on the concave surface of each of the curve-shaped strip structures 250 has the curvature radius being changed continuously, every position on the planar surfaces thereof has the curvature radius being the same (infinity), and each of two inflection points 270 between the concave surface and the planar surfaces respectively is continuous.

On the cross-sectional plane along the radial direction of the central axis z, as shown in FIG. 2C for example, each of the curve-shaped strip structures 250 may include the concave curve portion 260. When an angle between two tangential directions of two ends respectively of the concave curve portion 260 is β, the following condition may be satisfied: 90 degrees<β<170 degrees. Therefore, an entirety of each of the curve-shaped strip structures 250 being featured with a curved design is advantageous in corresponding to the injection gate of the narrow runner in the injection molding process and providing a proper structural strength of the plastic annular optical element 200. Furthermore, the two ends of the concave curve portion 260 are the two inflection points 270 respectively.

Specifically, a concave curve portion of each of the curve-shaped strip structures of a plastic annular optical element according to the present disclosure may be a concave surface, wherein every position on the concave curve portion (the concave surface) has the curvature radius being the same or changed continuously. In the 2nd embodiment, the concave curve portion 260 of each of the curve-shaped strip structures 250 is a concave surface, wherein every position on the concave curve portion 260 (the concave surface) has the curvature radius being changed continuously.

In FIG. 2A to FIG. 2C, each of the curve-shaped strip structures 250 may include the at least one inverse curve structure 280. Therefore, it is favorable for the plastic annular optical element 200 with the curve-shaped strip structures 250 being properly arranged thereon to reduce the production difficulties.

According to the present disclosure, each of the curve-shaped strip structures of a plastic annular optical element is curved in a concave form. On the cross-sectional plane along the radial direction of the central axis, each of the curve-shaped strip structures includes a concave surface specifically, wherein an inverse curve structure may be a planar surface, and an inflection point between the concave surface and the inverse curve structure (the planar surface) is continuous. The inverse curve structure may be a convex surface, every position on the inverse curve structure (the convex surface) has the curvature radius being the same or changed continuously, and an inflection point between the concave surface and the inverse curve structure (the convex surface) is continuous. Furthermore, each of the curve-shaped strip structures may include at least two inflection points. Each of the curve-shaped strip structures may have a change from a concave surface to a planar surface, then to another concave surface, or a change from a concave surface to a convex surface, then to another concave surface, but not limited thereto. The another concave surface is also an inverse curve structure, thus an inverse curve structure may be another concave surface. In addition, another concave surface may be deemed to a concave curve portion of a plastic annular optical element according to the present disclosure. In the 2nd embodiment, each of the curve-shaped strip structures 250 includes the two inverse curve structures 280, which are planar surfaces, and the two inflection points 270 between the concave curve portion 260 and the two inverse curve structures 280 respectively are both continuous. Therefore, the two inverse curve structures 280 is advantageous in flatting two ends of each of the curve-shaped strip structures 250, and thereby it matches the appearance of the plastic annular optical element 200.

On the cross-sectional plane along the radial direction of the central axis z, as shown in FIG. 2C for example, each of the curve-shaped strip structures 250 includes the concave curve portion 260, which may be aspheric. When a conic coefficient of an equation of an aspheric surface profile of the concave curve portion 260 is k, the following condition may be satisfied: −10<k<10. Therefore, the plastic annular optical element 200 with the conic coefficient k satisfying the aforementioned range is advantageous in increasing the surface smoothness of the concave curve portions 260 so as to reduce the machining complexity.

The following Equation (2.1) is the equation of the aspheric surface profile, which is commonly used to describe a surface shape of an optical effective portion of a lens element, wherein Y is the vertical distance from a point on the aspheric surface to the optical axis (the central axis), X is the relative distance between the point on the aspheric surface spaced at the vertical distance Y from the optical axis and the tangential plane at the aspheric surface vertex on the optical axis, R is the curvature radius, k is the conic coefficient, and Ai is the i-th aspheric coefficient. According to a plastic annular optical element of the present disclosure, a concave curve portion of each of the curve-shaped strip structures may not be symmetrical to a central axis, Thus, when a surface of concave curve portion is described by Equation (2.1), X and Y of a Cartesian coordinate system shall be adjusted based on a specific location of the concave curve portion.

$$X(Y) = (Y^2/R)/\left(1 + \text{sqrt}\left(1 - (1+k) \times (Y/R)^2\right)\right) + \sum_i (Ai) \times (Y^i) \qquad \text{Equation (2.1)}$$

Figure 2D:
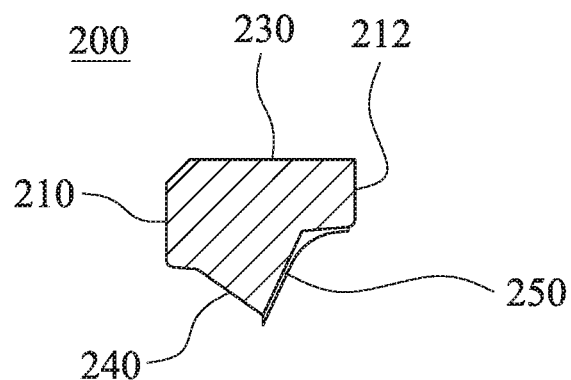
FIG. 2D is a schematic view of the parameters of the plastic annular optical element according to the 2nd embodiment.
Figure 2D:
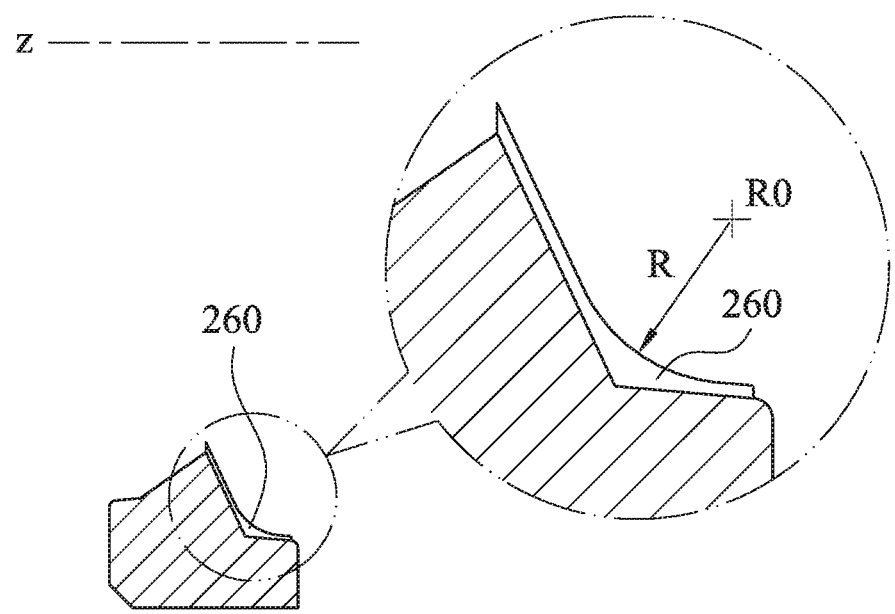

The appearances being curved in the concave forms of the curve-shaped strip structures 250 are mainly contributed by the concave curve portions 260 being aspheric, wherein each of the concave curve portions 260 is described by the equation of the aspheric surface profiles, and the plastic annular optical element 200 includes the two inverse curve structures 280, When the conic coefficient k of the plastic annular optical element 200 satisfies the aforementioned range −10 to 10, it is favorable for the plastic annular optical element 200 to provide further effective solutions. The machining process of the molds for the curve-shaped strip structures 250, which is different from chamfering in the conventional machining process, would be further successive. It is also favorable for a better structural quality of a V-shaped groove between adjacent two structures of the curve-shaped strip structures 250 after molding, and thereby increasing the production efficiency of the plastic annular optical element 200, FIG. 2D is a schematic view of the parameters of the plastic annular optical element 200 according to the 2nd embodiment, wherein FIG. 2D is also the cross-sectional view along line 2C-2C of FIG. 2B, as FIG. 2C. On the cross-sectional plane along the radial direction of the central axis z, as shown in FIG. 2D for example, each of the curve-shaped strip structures 250 includes the concave curve portion 260. When a curvature radius of the concave curve portion 260 is R, the following condition may be satisfied: 0.02 mm<R<2.0 mm. Therefore, the plastic annular optical element 200 with the curvature radius R satisfying the aforementioned range is beneficial for effectively controlling the shrinkage of the plastic annular optical element 200 after molding. In detail, the curve-shaped strip structures 250 are in charge of more proportion of the shrinkage of the plastic annular optical element 200. In FIG. 2D, the concave curve portion 260 is aspheric, wherein the conic coefficient k of the equation of the aspheric surface profile thereof is −5. A curvature radius R of the central position of the concave curve portion 260 is 0.232 mm, wherein the curvature radius R and a curvature center R0 of the central position of the concave curve portion 260 are shown in FIG. 2D, and it could be said that the concave curve portion 260 being aspheric can be adjusted from a spherical surface with a curvature radius being 0.232 mm. Every position on the concave curve portion 260 has the curvature radius R being changed continuously and satisfying the range aforementioned in this paragraph.

A number of the curve-shaped strip structures 250 may be greater than or equal to 105, and smaller than or equal to 380. Therefore, the curve-shaped strip structures 250 being densely arranged are advantageous in effectively reducing the stray light reflection of the plastic annular optical element 200.

In FIG. 2B, an angle with respect to the central axis z between any adjacent two of the curve-shaped strip structures 250 is θ, that is, θ is a center-to-center spacing angle in the circumferential direction of the central axis z between any adjacent two of the curve-shaped strip structures 250. In the 2nd embodiment, the angle θ with respect to the central axis z between any adjacent two of the curve-shaped strip structures 250 is 1.0 degree, and the number of the curve-shaped strip structures 250 is 360.

In FIG. 2A and FIG. 2B, a transverse cross-sectional plane of each of the curve-shaped strip structures 250 may be triangular, wherein the transverse cross-sectional plane of each of the curve-shaped strip structures 250 is a cross-sectional plane thereof along the circumferential direction of the central axis z. Therefore, it is favorable for the mold release step of the injection molding process for the plastic annular optical element 200. In the 2nd embodiment, the transverse cross-sectional plane of each of the curve-shaped strip structures 250 is isosceles triangular, shown as an end farther from the central axis z of each of the curve-shaped strip structures 250 in the enlarged view in FIG. 2B, The transverse cross-sectional plane of each of the curve-shaped strip structures 250, is isosceles triangular, and thereby adjacent two of the curve-shaped strip structures 250, which are closely arranged, form a V-shaped groove. That is, the transverse cross-sectional plane and the V-shaped groove thereof highly correlate with each other. In addition, a structure between adjacent two of the curve-shaped strip structures 250 is shown as FIG. 2F and FIG. 2C, and may be adjusted as needed. In other embodiments according to the present disclosure (not shown in drawings), a transverse cross-sectional plane of each of the curve-shaped strip structures may be rectangular, wedge-shaped, but not limited thereto.

For a conventional spacer, when two annular sections of an inner annular surface (such as two annular sections of the inner annular surface 240, at which the curve-shaped strip structures 250 is located, in FIG. 2C) both need to add the machining of V-shaped grooves, V-shaped grooves of one of the two annular sections is permitted to be machined after finishing the machining for the other one of two annular sections in a conventional process. However, in case a number of V-shaped grooves is large, the conventional process being separately machining would result in spending unnecessary additional time, additional wearing of machining tools after intermittently repetitive movements, and increasing the production cost. The curve-shaped strip structures being curved in the concave forms according to the present disclosure are advantageous in solving the aforementioned problems and maintaining the features of reducing light reflection simultaneously.

The plastic annular optical element 200 may be made by an injection molding method. When an injection molding shrinkage rate of the plastic annular optical element 200 is S, the following condition may be satisfied: 0.05%<S<1.4%. Therefore, it is favorable for reducing the warpage occurrences resulted from abnormal shrinkage of the curve-shaped strip structures 250. Preferably, the following condition may be satisfied: 0.1%<S≤1.0%. Furthermore, an injection molding shrinkage rate S of a plastic annular optical element according to the present disclosure indicates an injection molding shrinkage rate of a plastic material of the plastic annular optical element, and the aforementioned Table 1.1 lists injection molding shrinkage rates of several plastic materials. In the 2nd embodiment, the plastic annular optical element 200 is made of a polycarbonate (PC) material being black. More specifically, the polycarbonate material is SP series from the manufacturer Teijin.

The data of the aforementioned parameters of the plastic annular optical element 200 according to the 2nd embodiment of the present disclosure are listed in the following Table 2, wherein the parameters are also shown as FIG. 2B to FIG. 2D.

TABLE 2

| 2nd embodiment | | | |
|---|---|---|---|
| β (deg.) | 120 | S | 0.6%~0.8% |
| R (mm) | 0.232 | k | −5 |
| θ (deg.) | 1.0 | | |

3rd Embodiment

Figure 3A:
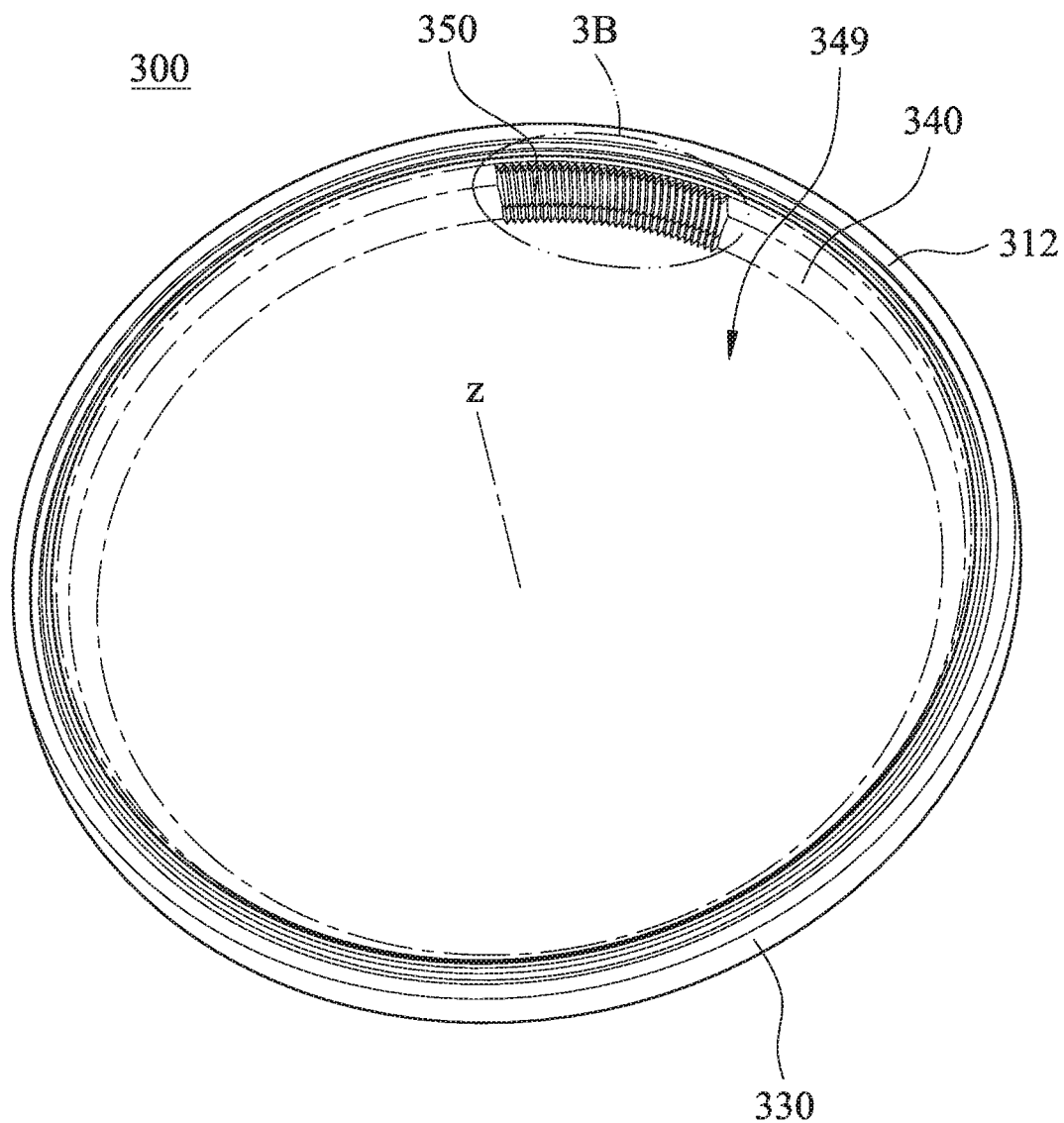
FIG. 3A is a three-dimensional view of a plastic annular optical element according to the 3rd embodiment of the present disclosure.

FIG. 3A is a three-dimensional view of a plastic annular optical element 300 according to the 3rd embodiment of the present disclosure. In FIG. 3A, the plastic annular optical element 300 includes an outer diameter surface 330 and an inner annular surface 340, The outer diameter surface 330 surrounds a central axis z of the plastic annular optical element 300. The inner annular surface 340 surrounds the central axis z and forms a central hole 349. The inner annular surface 340 includes a plurality of curve-shaped strip structures 350, In addition, the plastic annular optical element 300 further includes an object-side surface 310 and an image-side surface 312. When the plastic annular optical element 300 is applied in a lens module (not shown herein), the object-side surface 310 faces an imaged object (not shown herein), and the image-side surface 312 faces an image surface (not shown herein).

Figure 3B:
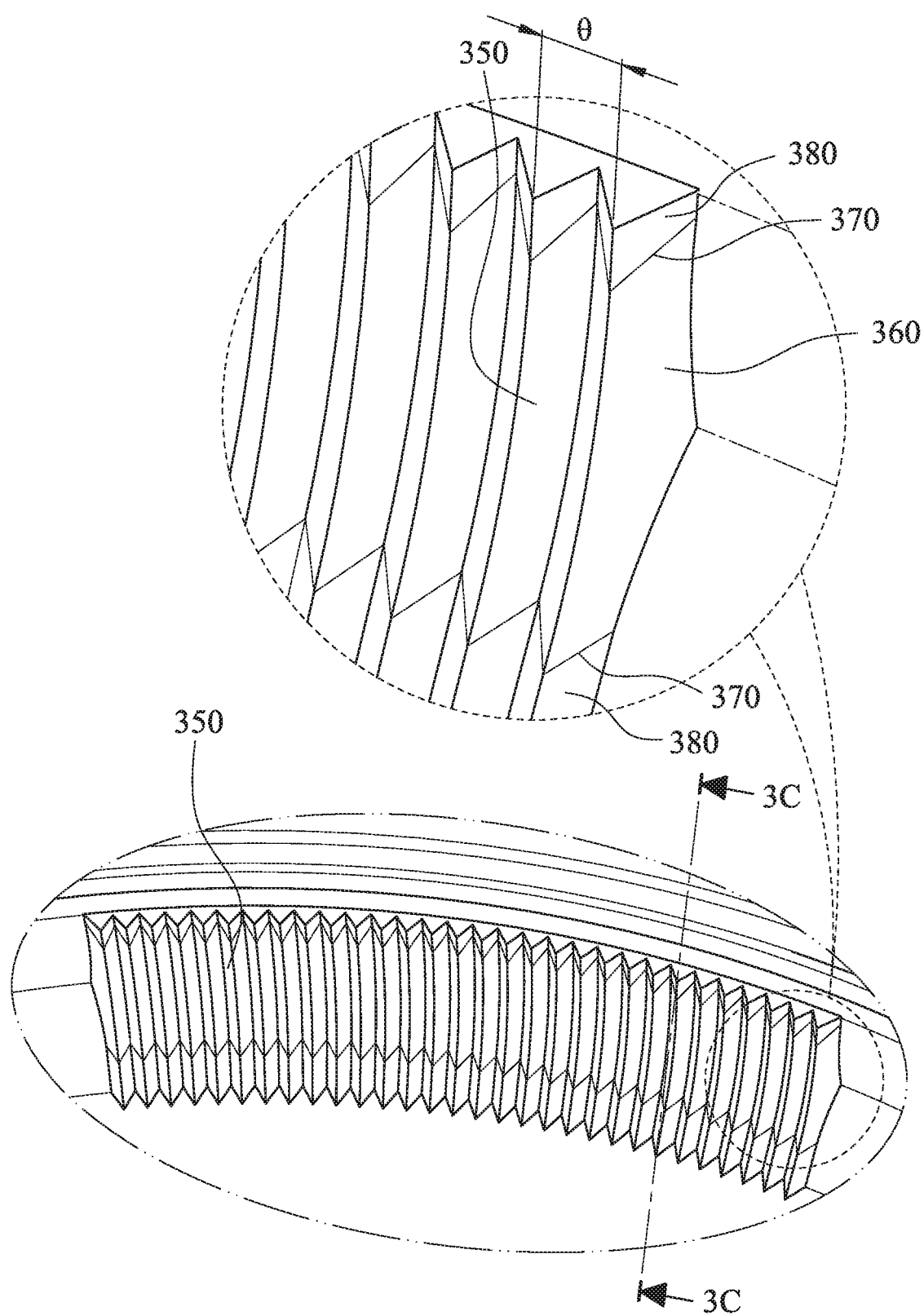
FIG. 3B is an enlarged view of part 3B in FIG. 3A.
Figure 3C:
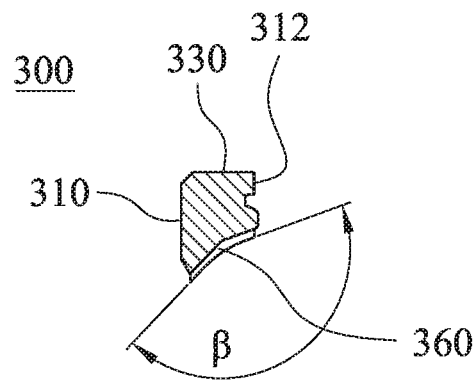
FIG. 3C is a cross-sectional view along line 3C-3C of FIG. 3B.
Figure 3C:
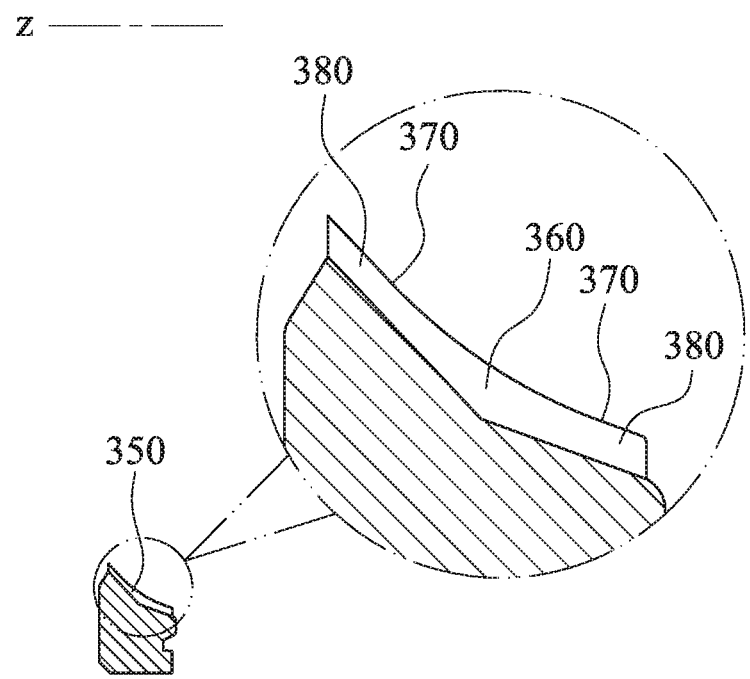

FIG. 3B is an enlarged view of part 3B in FIG. 3A. FIG. 3C is a cross-sectional view along line 3C-3C of FIG. 3B, wherein. FIG. 3C shows a cross-sectional plane along a most protruding surface of each of the curve-shaped strip structures 350, which is parallel to a radial direction of the central axis z (the most protruding surface is in a longitudinal direction of each of the curve-shaped strip structures 350), and FIG. 3C is also a longitudinal cross-sectional view of each of the curve-shaped strip structures 350, In FIG. 3A to FIG. 3C, each of the curve-shaped strip structures 350 is located and extended along the radial direction of the central axis z, and each of the curve-shaped strip structures 350 is curved in a concave form, That is, each single of the curve-shaped strip structures 350 is curved in the concave form, which is extended along a corresponding radial direction with respect to the central axis z. The curve-shaped strip structures 350 are prearranged in a circumferential direction of the central axis z and around the central hole 349.

The plastic annular optical element 300 of the 3rd embodiment is a retainer. Each of the curve-shaped strip structures 350 curved in the concave form is advantageous in increasing the structural strength of the plastic annular optical element 300 after injection molding, so that the dimensional accuracy of the outer diameter of the plastic annular optical element 300 being as the retainer is allowed to maintain the better roundness before assembling and being pressed after assembling.

Specifically, every one of the curve-shaped strip structures 350 has the same structure and shape. On the cross-sectional plane along the radial direction of the central axis z, as shown in FIG. 3C for example, the surface of each of the curve-shaped strip structures 350 is continuous, and each of the curve-shaped strip structures 350 is curved in the concave form. The surface of each of the curve-shaped strip structures 350 along the radial direction of the central axis z is composed of a concave surface (i.e. a concave curve portion 360) and two planar surfaces (i.e. two inverse curve structures 380), wherein two ends of the concave surface respectively connects the two planar surfaces. The surface of each of the curve-shaped strip structures 350 along the radial direction of the central axis z is continuous. Specifically, every position on the concave surface of each of the curve-shaped strip structures 350 has the curvature radius being changed continuously, every position on the planar surfaces thereof has the curvature radius being the same, and each of two inflection points 370 between the concave surface and the planar surfaces respectively is continuous.

In FIG. 3A and FIG. 3C, each of the curve-shaped strip structures 350 includes the one concave curve portion 360 and the two inverse curve structures 380, wherein two ends of the concave curve portion 360 respectively connects the two inverse curve structures 380. The concave curve portion 360 of each of the curve-shaped strip structures 360 is a concave surface, wherein every position on the concave curve portion 360 has the curvature radius being changed continuously. The two inverse curve structures 380 are planar surfaces, and the two inflection points 370 between the concave curve portion 360 and the two inverse curve structures 380 respectively are both continuous.

Figure 3D:
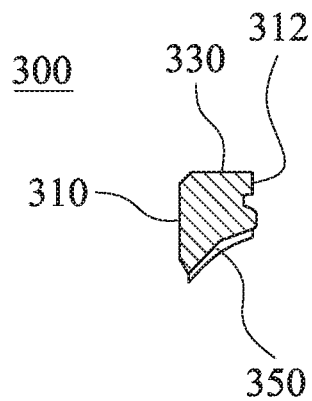
FIG. 3D is a schematic view of the parameters of the plastic annular optical element according to the 3rd embodiment.
Figure 3D:
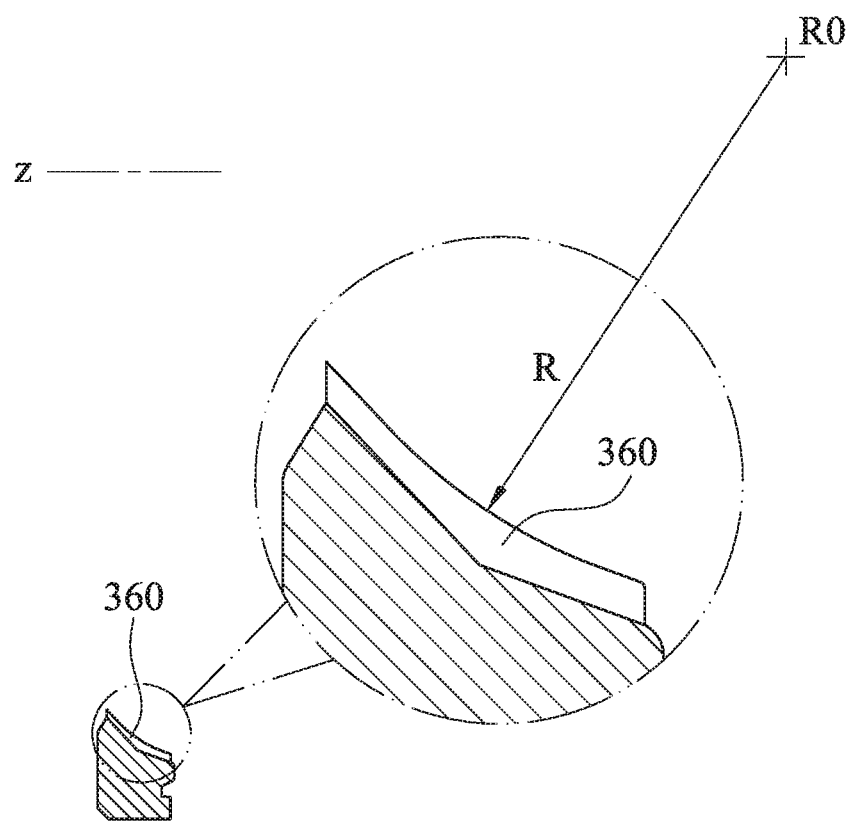

FIG. 3D is a schematic view of the parameters of the plastic annular optical element 300 according to the 3rd embodiment, wherein FIG. 3D is also the cross-sectional view along line 3C-3C of FIG. 3B, as FIG. 3C. On the cross-sectional plane along the radial direction of the central axis z, as shown in FIG. 3D for example, the concave curve portion 360 is aspheric, wherein a conic coefficient k of the equation of the aspheric surface profile thereof is 1. A curvature radius R of the central position of the concave curve portion 360 is 0.5 mm, wherein the curvature radius R and a curvature center R0 of the central position of the concave curve portion 360 are shown in FIG. 3D. Every position on the concave curve portion 360 has the curvature radius R being changed continuously, and the curvature radius R of every position satisfies the following condition: 0.02 mm<R<2.0 mm.

In the 3rd embodiment, a number of the curve-shaped strip structures 350 is 360. A transverse cross-sectional plane of each of the curve-shaped strip structures 350 is isosceles triangular, shown as an end farther from the central axis z of each of the curve-shaped strip structures 350 in the enlarged view in FIG. 3B.

The plastic annular optical element 300 is made by an injection molding method, and the aforementioned Table 1.1 lists injection molding shrinkage rates of several plastic materials. In the 3rd embodiment, the plastic annular optical element 300 is made of a polycarbonate (PC) material being black. More specifically, the polycarbonate material is L-1225Y series from the manufacturer Teijin.

The data of the parameters of the plastic annular optical element 300 according to the 3rd embodiment of the present disclosure are listed in the following Table 3, wherein the parameters are also shown as FIG. 3B to FIG. 3D. The definitions of these parameters shown in Table 3 are the same as those stated in the plastic annular optical element 200 of the 2nd embodiment with corresponding values for the plastic annular optical element 300.

TABLE 3

| 3rd embodiment | | | |
|---|---|---|---|
| β (deg.) | 153.35 | S | 0.6%~0.8% |
| R (mm) | 0.5 | k | 1 |
| θ (deg.) | 1.0 | | |

4th Embodiment

Figure 4A:
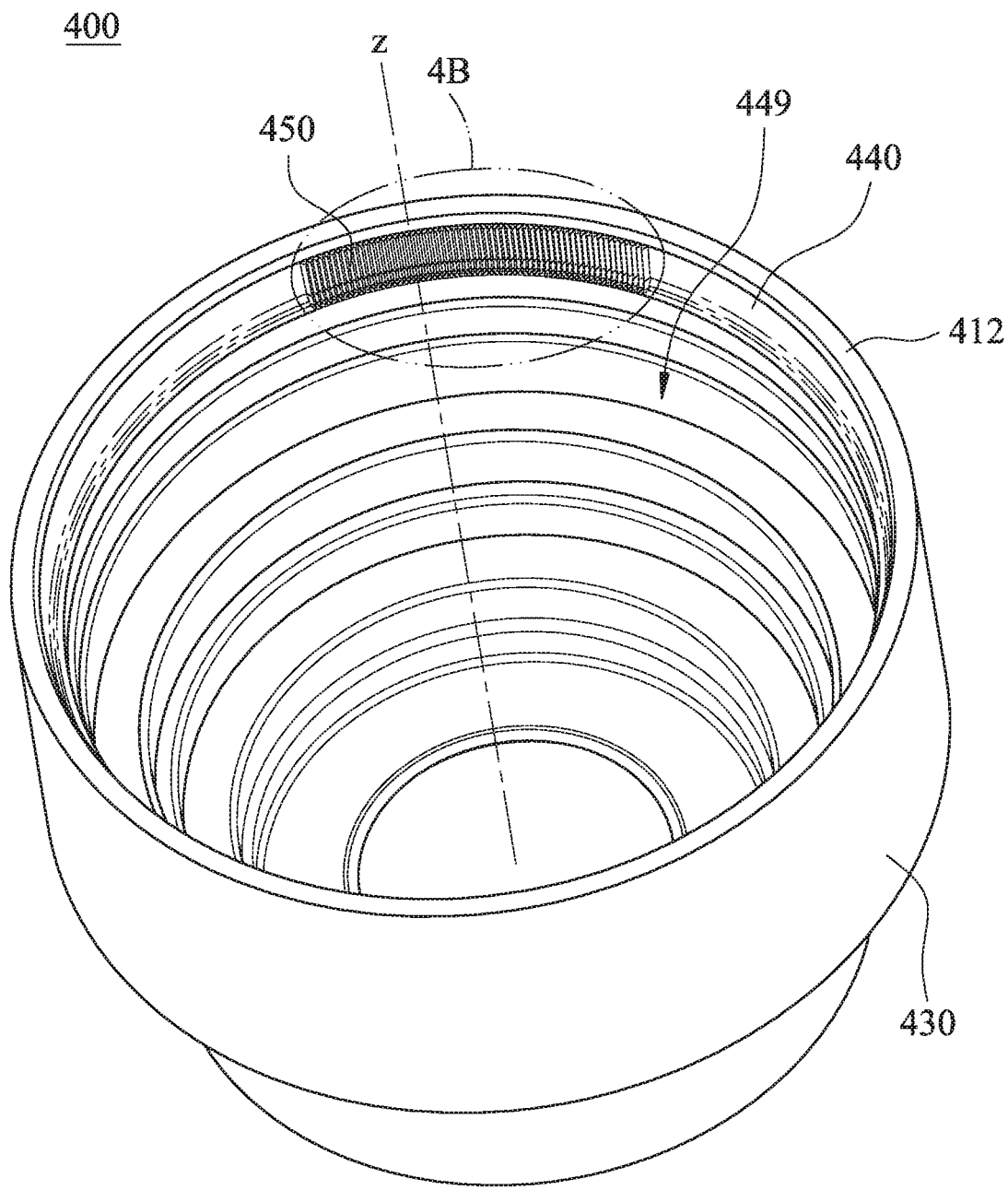
FIG. 4A is a three-dimensional view of a plastic annular optical element according to the 4th embodiment of the present disclosure.

FIG. 4A is a three-dimensional view of a plastic annular optical element 400 according to the 4th embodiment of the present disclosure. In FIG. 4A, the plastic annular optical element 400 includes an outer diameter surface 430 and an inner annular surface 440. The outer diameter surface 430 surrounds a central axis z of the plastic annular optical element 400. The inner annular surface 440 surrounds the central axis z and forms a central hole 449. The inner annular surface 440 includes a plurality of curve-shaped strip structures 450. In addition, the plastic annular optical element 400 further includes an object-side surface 410 and an image-side surface 412. When the plastic annular optical element 400 is applied in a lens module (not shown herein), the object-side surface 410 faces an imaged object (not shown herein), and the image-side surface 412 faces an image surface (not shown herein).

Figure 4B:
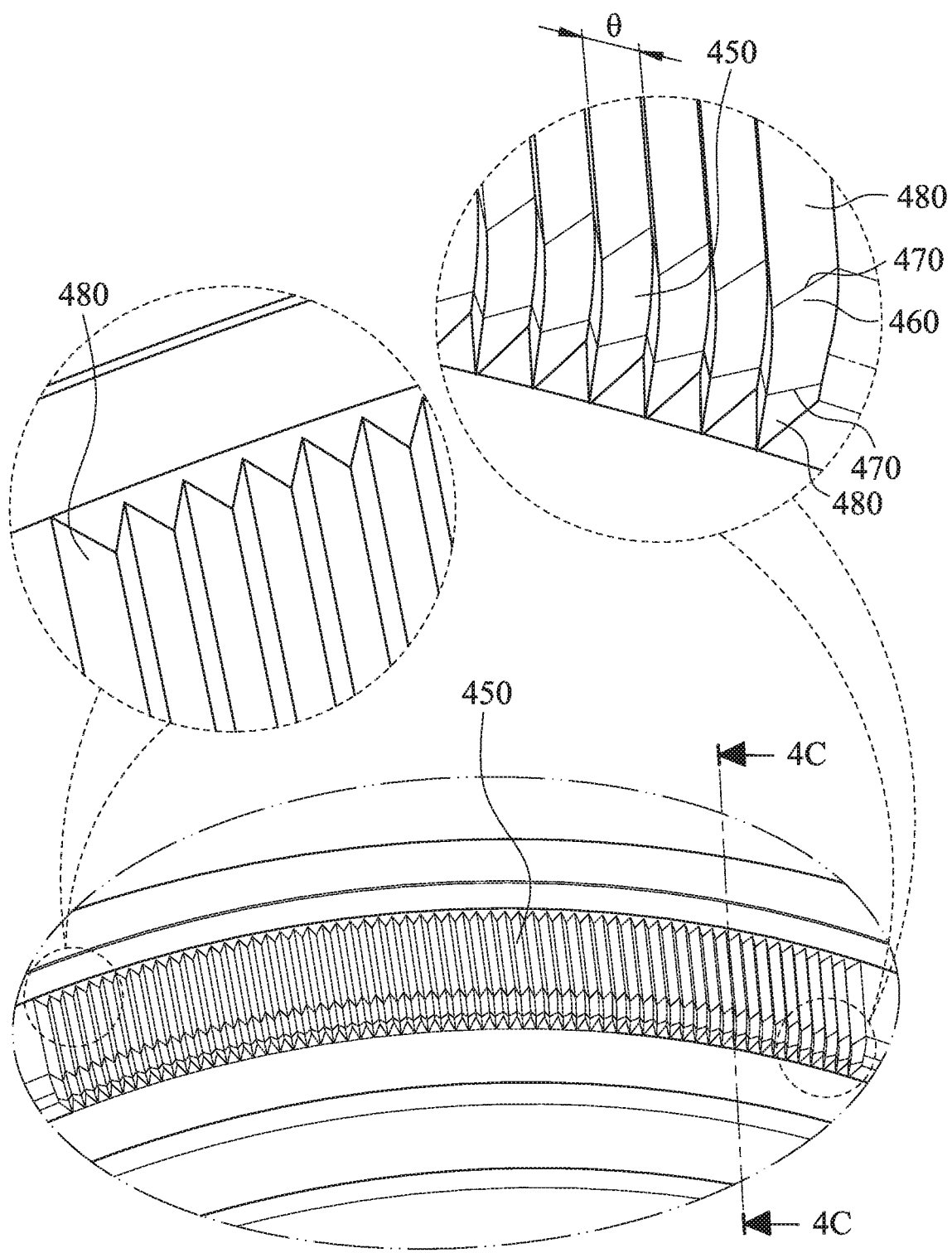
FIG. 4B is an enlarged view of part 4B in FIG. 4A.
Figure 4C:
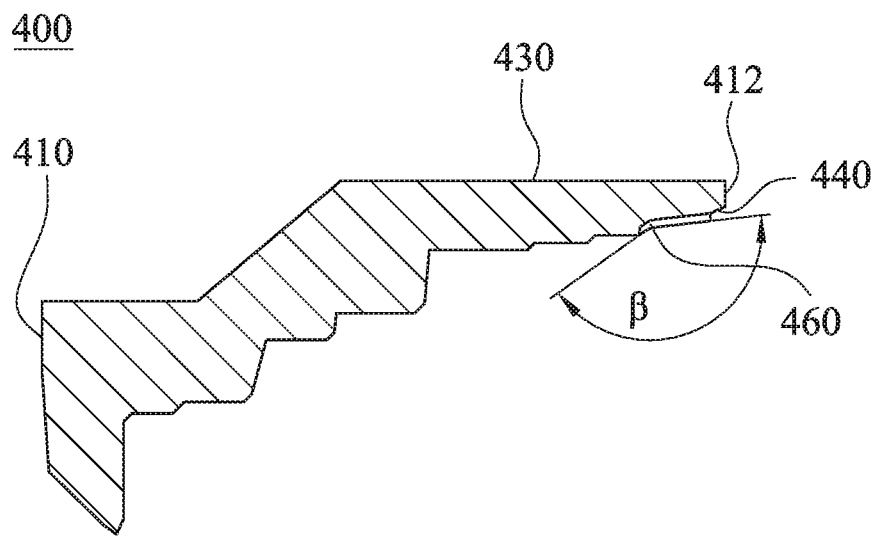
FIG. 4C is a cross-sectional view along line 4C-4C of FIG. 4B.
Figure 4C:
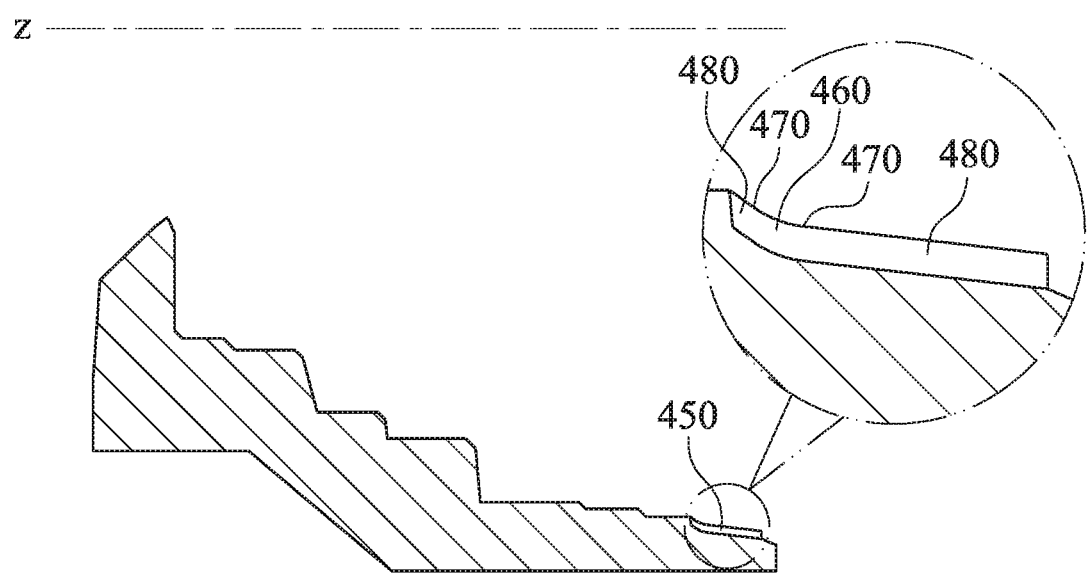

FIG. 4B is an enlarged view of part 4B in FIG. 4A. FIG. 4C is a cross-sectional view along line 4C-4C of FIG. 4B, wherein FIG. 4C shows a cross-sectional plane along a most protruding surface of each of the curve-shaped strip structures 450, which is parallel to a radial direction of the central axis z (the most protruding surface is in a longitudinal direction of each of the curve-shaped strip structures 450), and FIG. 4C is also a longitudinal cross-sectional view of each of the curve-shaped strip structures 450. In FIG. 4A to FIG. 4C, each of the curve-shaped strip structures 450 is located and extended along the radial direction of the central axis z, and each of the curve-shaped strip structures 450 is curved in a concave form. That is, each single of the curve-shaped strip structures 450 is curved in the concave form, which is extended along a corresponding radial direction with respect to the central axis z. The curve-shaped strip structures 450 are prearranged in a circumferential direction of the central axis z and around the central hole 449.

The plastic annular optical element 400 of the 4th embodiment is a lens barrel. Each of the curve-shaped strip structures 450 curved in the concave form is advantageous in increasing the structural strength of the plastic annular optical element 400 after injection molding, so that the dimensional accuracy of the inner diameter of the plastic annular optical element 400 being as the lens barrel is allowed to maintain the better roundness before assembling and being pressed after assembling.

Specifically, every one of the curve-shaped strip structures 450 has the same structure and shape. On the cross-sectional plane along the radial direction of the central axis z, as shown in FIG. 4C for example, the surface of each of the curve-shaped strip structures 450 is continuous, and each of the curve-shaped strip structures 450 is curved in the concave form. The surface of each of the curve-shaped strip structures 450 along the radial direction of the central axis z is composed of a concave surface (i.e. a concave curve portion 460) and two planar surfaces (i.e. two inverse curve structures 480), wherein two ends of the concave surface respectively connects the two planar surfaces. The surface of each of the curve-shaped strip structures 450 along the radial direction of the central axis z is continuous. Specifically, every position on the concave surface of each of the curve-shaped strip structures 450 has the curvature radius being the same, every position on the planar surfaces thereof has the curvature radius being the same, and each of two inflection points 470 between the concave surface and the planar surfaces respectively is continuous.

In FIG. 4A and FIG. 4C, each of the curve-shaped strip structures 450 includes the one concave curve portion 460 and the two inverse curve structures 480, wherein two ends of the concave curve portion 460 respectively connects the two inverse curve structures 480. The concave curve portion 460 of each of the curve-shaped strip structures 450 is a concave surface, wherein every position on the concave curve portion 460 has the curvature radius being the same. The two inverse curve structures 480 are planar surfaces, and the two inflection points 470 between the concave curve portion 460 and the two inverse curve structures 480 respectively are both continuous.

Figure 4D:
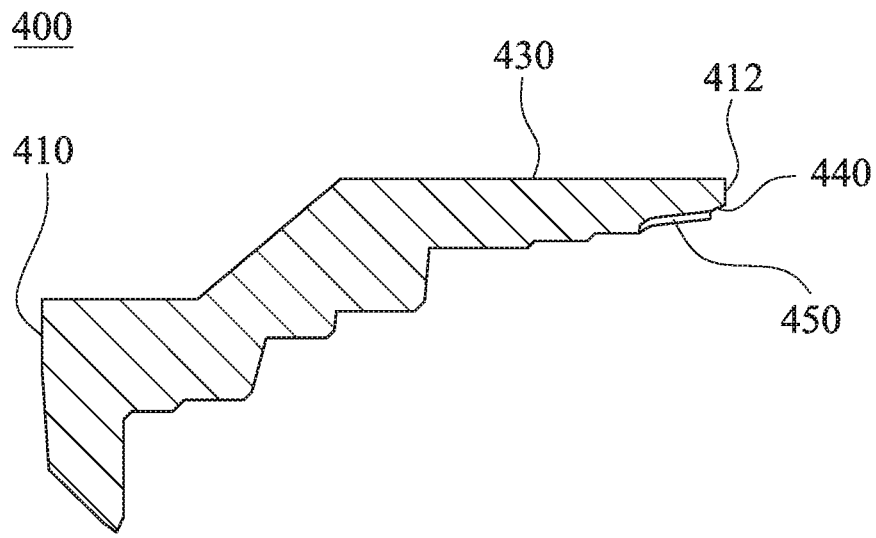
FIG. 4D is a schematic view of the parameters of the plastic annular optical element according to the 4th embodiment.
Figure 4D:
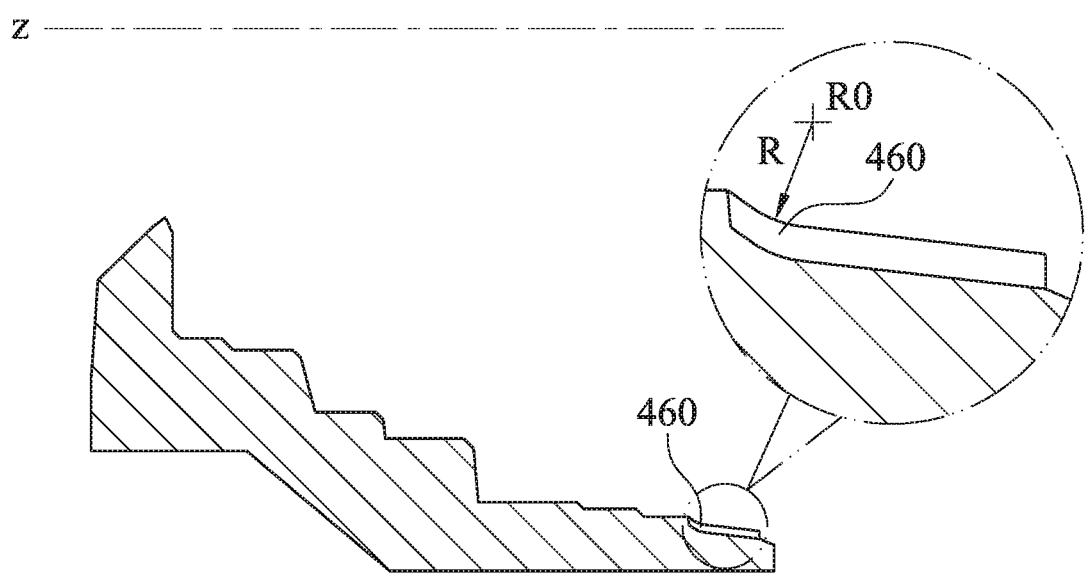

FIG. 4D is a schematic view of the parameters of the plastic annular optical element 400 according to the 4th embodiment, wherein FIG. 4D is also the cross-sectional view along line 4C-4C of FIG. 4B, as FIG. 4C. On the cross-sectional plane along the radial direction of the central axis z, as shown in FIG. 4D for example, the concave curve portion 460 is spherical, wherein a conic coefficient k of the equation of the aspheric surface profile thereof is 0. A curvature radius R of every position of the concave curve portion 460 is 0.15 mm, wherein the curvature radius R and a curvature center R0 of every position of the concave curve portion 460 are shown in FIG. 4D.

In the 4th embodiment, a number of the curve-shaped strip structures 450 is 360. A transverse cross-sectional plane of each of the curve-shaped strip structures 450 is isosceles triangular, shown as two ends of each of the curve-shaped strip structures 450 in the enlarged view in FIG. 4B.

The plastic annular optical element 400 is made by an injection molding method, and the aforementioned Table 1.1 lists injection molding shrinkage rates of several plastic materials. In the 4th embodiment, the plastic annular optical element 400 is made of a cyclic olefin copolymer (COC) material being black, More specifically, the cyclic olefin copolymer material is COG series from the manufacturer TOPAS.

The data of the parameters of the plastic annular optical element 400 according to the 4th embodiment of the present disclosure are listed in the following Table 4, wherein the parameters are also shown as FIG. 4B to FIG. 4D, The definitions of these parameters shown in Table 4 are the same as those stated in the plastic annular optical element 200 of the 2nd embodiment with corresponding values for the plastic annular optical element 400.

TABLE 4

| 4th embodiment | | | |
|---|---|---|---|
| β (deg.) | 151 | S | 0.6%~0.7% |
| R (mm) | 0.15 | k | 0 |
| θ (deg.) | 1.0 | | |

5th Embodiment

Figure 5A:
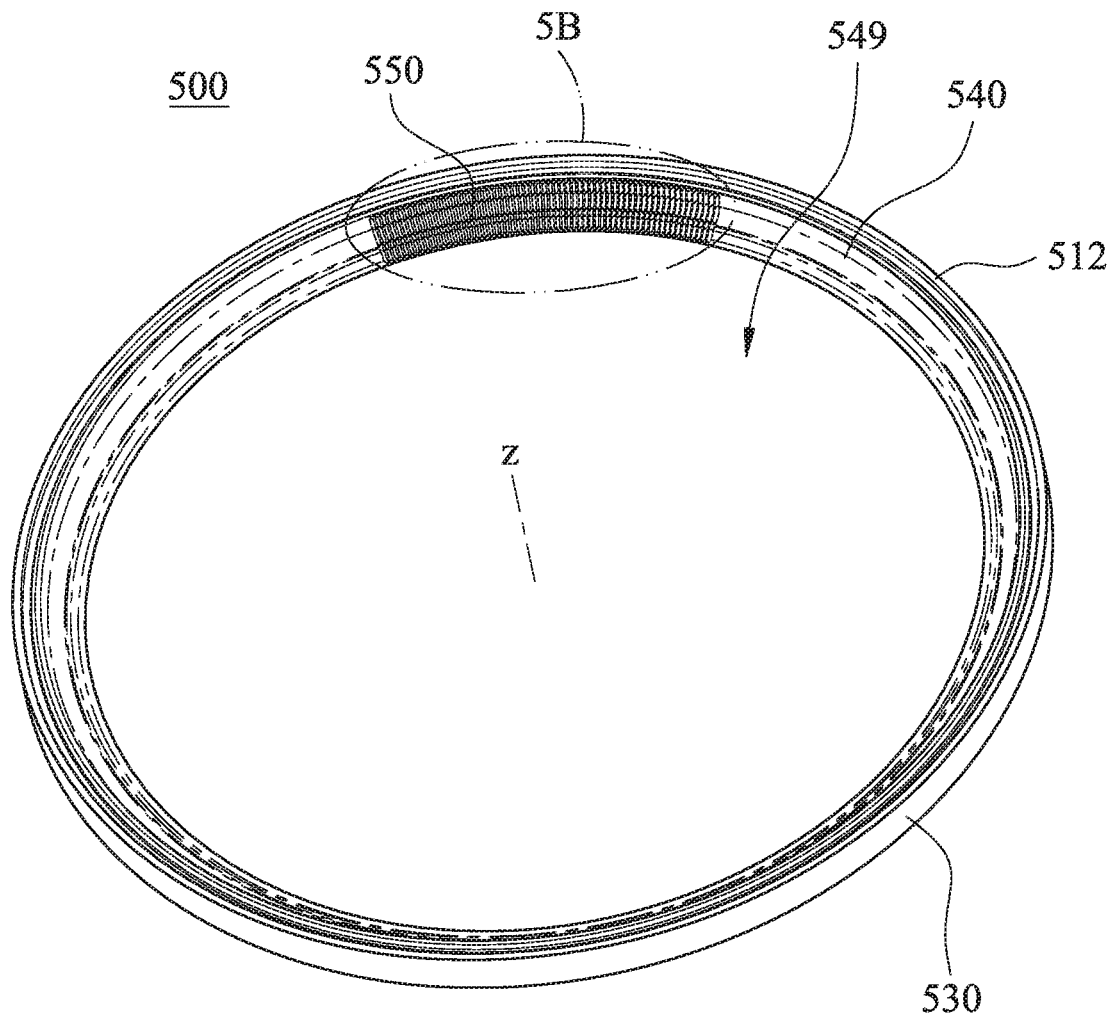
FIG. 5A is a three-dimensional view of a plastic annular optical element according to the 5th embodiment of the present disclosure.

FIG. 5A is a three-dimensional view of a plastic annular optical element 500 according to the 5th embodiment of the present disclosure. In FIG. 5A, the plastic annular optical element 500 includes an outer diameter surface 530 and an inner annular surface 540. The outer diameter surface 530 surrounds a central axis z of the plastic annular optical element 500. The Inner annular surface 540 surrounds the central axis z and forms a central hole 549. The inner annular surface 540 includes a plurality of curve-shaped strip structures 550. In addition, the plastic annular optical element 500 further includes an object-side surface 510 and an image-side surface 512. When the plastic annular optical element 500 is applied in a lens module (not shown herein), the object-side surface 510 faces an imaged object (not shown herein), and the image-side surface 512 faces an image surface (not shown herein).

Figure 5B:
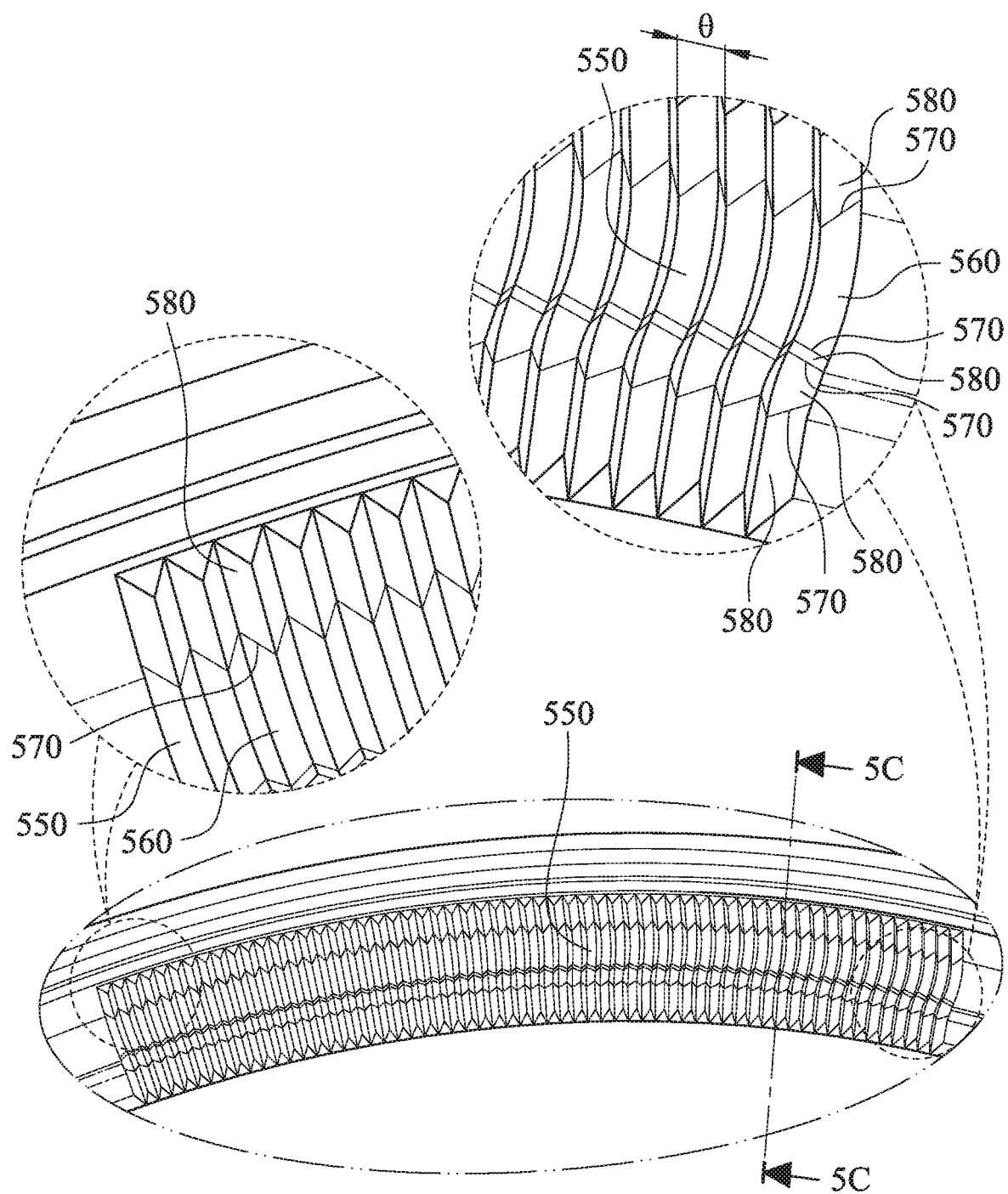
FIG. 5B is an enlarged view of part 5B in FIG. 5A.
Figure 5C:
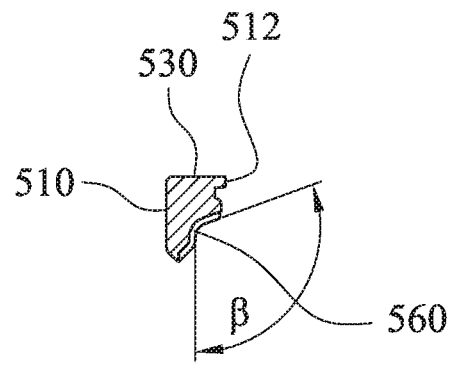
FIG. 5C is a cross-sectional view along line 5C-5C of FIG. 5B.
Figure 5C:
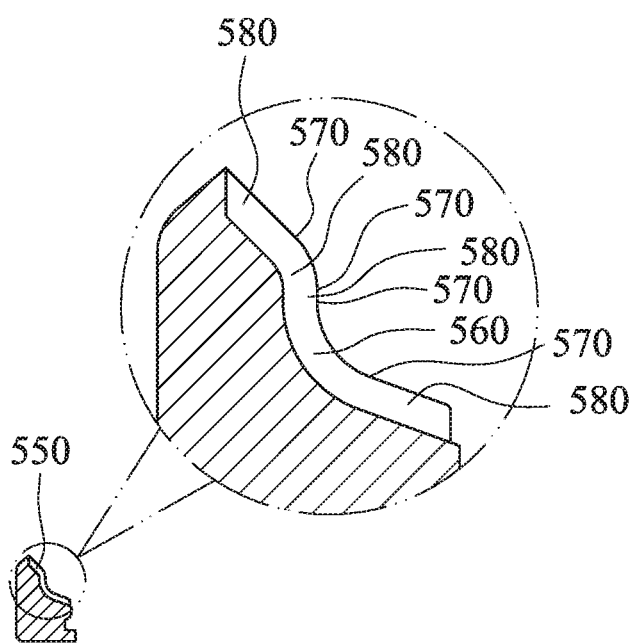

FIG. 5B is an enlarged view of part 5B in FIG. 5A. FIG. 5C is a cross-sectional view along line 5C-5C of FIG. 5B, wherein FIG. 5C shows a cross-sectional plane along a most protruding surface of each of the curve-shaped strip structures 550, which is parallel to a radial direction of the central axis z (the most protruding surface is in a longitudinal direction of each of the curve-shaped strip structures 550), and FIG. 5C is also a longitudinal cross-sectional view of each of the curve-shaped strip structures 550. In FIG. 5A to FIG. 5C, each of the curve-shaped strip structures 550 is located and extended along the radial direction of the central axis z, and each of the curve-shaped strip structures 550 is curved in a concave form. That is, each single of the curve-shaped strip structures 550 is curved in the concave form, which is extended along a corresponding radial direction with respect to the central axis z. The curve-shaped strip structures 550 are prearranged in a circumferential direction of the central axis z and around the central hole 549. Furthermore, the plastic annular optical element 500 of the 5th embodiment is a retainer.

Specifically, every one of the curve-shaped strip structures 550 has the same structure and shape. On the cross-sectional plane along the radial direction of the central axis z, as shown in FIG. 5C for example, the surface of each of the curve-shaped strip structures 550 is continuous, and each of the curve-shaped strip structures 550 is curved in the concave form. The surface of each of the curve-shaped strip structures 550 in order from the object-side surface 510 to the image-side surface 512 along the radial direction of the central axis z includes a planar surface (i.e. an inverse curve structure 580), a convex surface (i.e. another inverse curve structure 580), a planar surface (i.e. further another inverse curve structure 580), a concave surface (i.e. a concave curve portion 560) and a planar surface (i.e. still another curve structure 580). The surface of each of the curve-shaped strip structures 550 along the radial direction of the central axis z is continuous. Specifically, every position on the concave surface of each of the curve-shaped strip structures 550 has the curvature radius being changed continuously, every position on the planar surfaces thereof has the curvature radius being the same, every position on the convex surface thereof has the curvature radius being the same, and each of four inflection points 570 of each of the curve-shaped strip structures 550 is continuous shown in FIG. 5C.

In FIG. 5A and FIG. 5C, each of the curve-shaped strip structures 550 includes the one concave curve portion 560 and the four inverse curve structures 580 aforementioned in the last paragraph. The concave curve portion 560 of each of the curve-shaped strip structures 550 is a concave surface, wherein every position on the concave curve portion 560 has the curvature radius being changed continuously. For each of the curve-shaped strip structures 550, three of the inverse curve structures 580 are planar surfaces, the other one of the inverse curve structures 580 is a convex surface, and the four inflection points 570 among the concave curve portion 560 and the four inverse curve structures 580 are all continuous.

Figure 5D:
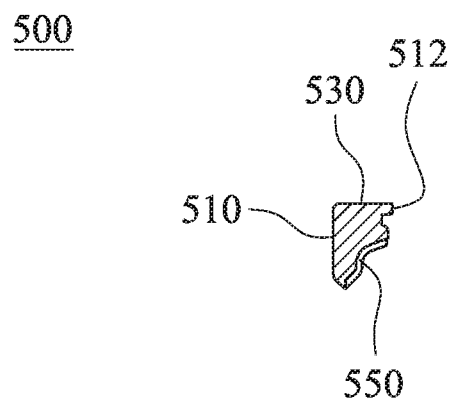
FIG. 5D is a schematic view of the parameters of the plastic annular optical element according to the 5th embodiment.
Figure 5D:
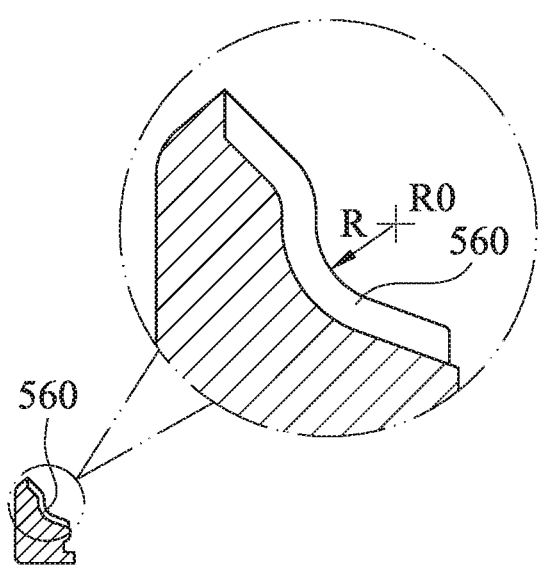

FIG. 5D is a schematic view of the parameters of the plastic annular optical element 500 according to the 5th embodiment, wherein FIG. 5D is also the cross-sectional view along line 5C-5C of FIG. 5B, as FIG. 5C. On the cross-sectional plane along the radial direction of the central axis z, as shown in FIG. 5D for example, the concave curve portion 560 is aspheric, wherein a conic coefficient k of the equation of the aspheric surface profile thereof is 3. A curvature radius R of the central position of the concave curve portion 560 is 0.07 mm, wherein the curvature radius R and a curvature center R0 of the central position of the concave curve portion 560 are shown in FIG. 5D. Every position on the concave curve portion 560 has the curvature radius R being changed continuously, and the curvature radius R of every position satisfies the following condition: 0.02 mm<R<2.0 mm.

In the 5th embodiment, a number of the curve-shaped strip structures 550 is 360. A transverse cross-sectional plane of each of the curve-shaped strip structures 550 is isosceles triangular, shown as an end farther from the central axis z of each of the curve-shaped strip structures 550 in the enlarged view in FIG. 5B.

The plastic annular optical element 500 is made by an injection molding method, and the aforementioned Table 1.1 lists injection molding shrinkage rates of several plastic materials. In the 5th embodiment, the plastic annular optical element 500 is made of a polycarbonate (PC) material being black. More specifically, the polycarbonate material is L-1225Y series from the manufacturer Teijin.

The data of the parameters of the plastic annular optical element 500 according to the 5th embodiment of the present disclosure are listed in the following Table 5, wherein the parameters are also shown as FIG. 5B to FIG. 5D. The definitions of these parameters shown in Table 5 are the same as those stated in the plastic annular optical element 200 of the 2nd embodiment with corresponding values for the plastic annular optical element 500.

TABLE 5

| 5th embodiment | | | |
|---|---|---|---|
| β (deg.) | 110 | S | 0.6%~0.8% |
| R (mm) | 0.07 | k | 3 |
| θ (deg.) | 1.0 | | |

6th Embodiment

Figure 6:
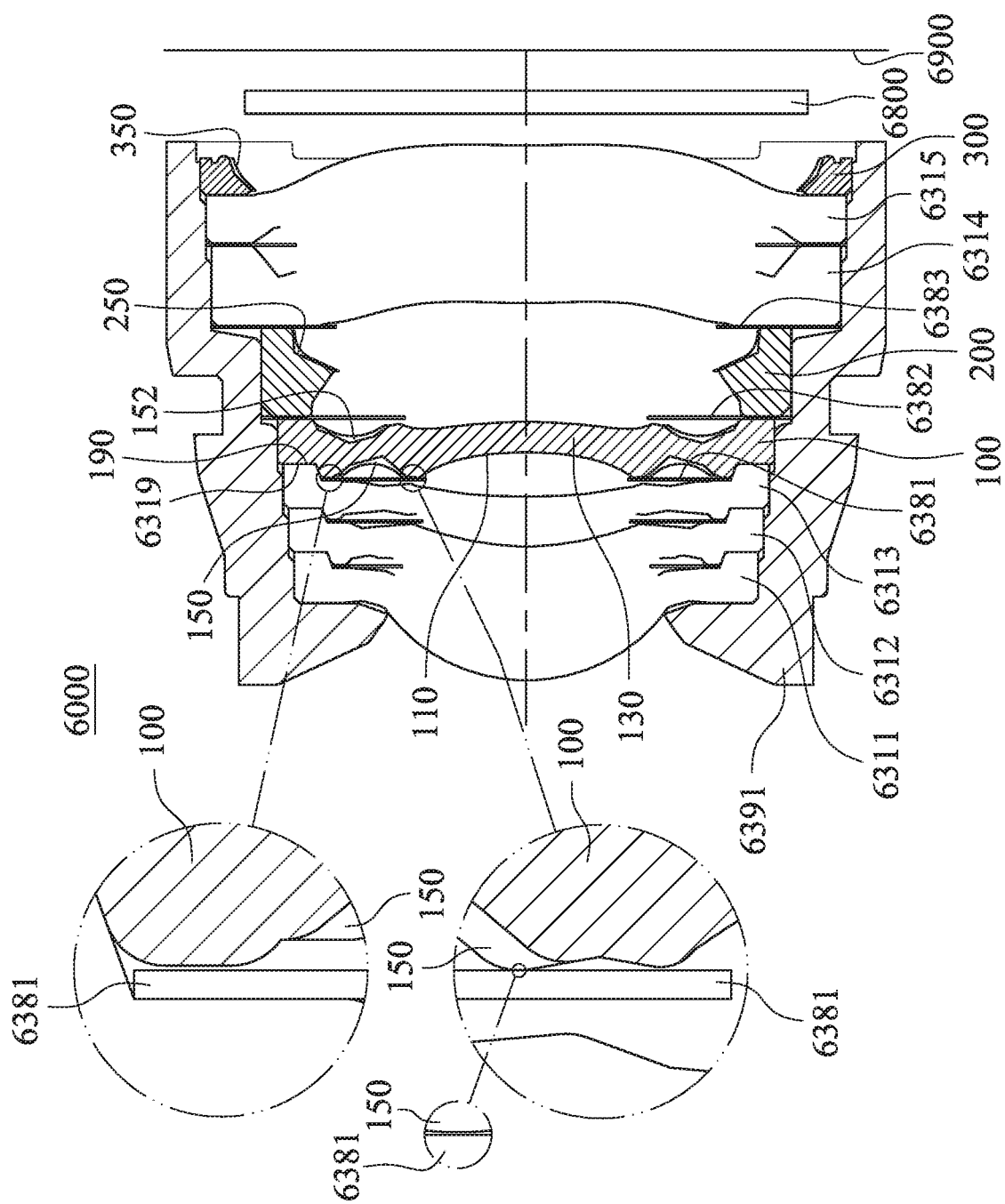
FIG. 6 is a schematic view of a lens module according to the 6th embodiment of the present disclosure.

FIG. 6 is a schematic view of a lens module 6000 according to the 6th embodiment of the present disclosure, wherein some details of optical elements are omitted. In FIG. 6, the lens module 6000 includes an optical lens set (its reference numeral is omitted herein). The optical lens set includes a plurality of optical elements, wherein one of the optical elements is the plastic lens element 100 of the 1st embodiment according to the present disclosure. Therefore, the curve-shaped strip structures 150 and 152 ensure a better quality of the optical effective portion 130 of the plastic lens element 100 and thereby are advantageous to the optical specification of the lens module 6000.

Furthermore, another two of the optical elements of the optical lens set of the lens module 6000 is the plastic annular optical element 200 of the 2nd embodiment and the plastic annular optical element 300 of the 3rd embodiment according to the present disclosure. Therefore, the curve-shaped strip structures 250 and 350 ensure the structural strength and the roundness of the plastic annular optical element 200 and 300 respectively, and thereby it is advantageous to the assembling accuracy and the optical specification of the lens module 6000. In addition, the plastic annular optical element 200 is a spacer, and the plastic annular optical element 300 is a retainer. The other details of the plastic lens element 100, the plastic annular optical elements 200 and 300 have been described in the foregoing paragraphs of the 1st to 3rd embodiments respectively and will not be described again herein.

In detail, the optical lens set of the lens module 6000 includes lens elements 6311, 6312, 6313, the plastic lens element 100, lens elements 6314, 6315, a glass panel 6800 and an image surface 6900 in order from an object side to an image side, wherein the optical lens set has a total of six lens elements (6311, 6312, 6313, 100, 6314 and 6315), which are disposed along the central axis z (i.e. an optical axis of the optical lens set) in an annular optical element 6391 being a lens barrel. Furthermore, the optical lens set of the lens module 6000 may further include other optical elements, which may be a lens element, an imaging compensation element, a light blocking sheet, a spacer, a retainer, a lens barrel or so on, wherein a light blocking sheet 6381 is disposed between the lens element 6313 and the plastic lens element 100, a light blocking sheet 6382 is disposed between the plastic lens element 100 and the plastic annular optical element 200, the plastic annular optical element 200 is disposed between light blocking sheets 6382 and 6383, and the plastic annular optical element 300 is disposed on an image side of the lens element 6315. The glass panel 6800 can be a cover glass, a filter or both above, and will not affect the focal length of the optical lens set.

In FIG. 6, the object-side surface 110 of the plastic lens element 100 may include the abutting surface 190 for abutting with the lens element 6313, which is one of the optical elements of the optical lens set. Specifically, the abutting surface 190 of the plastic lens element 100 and an abutting surface 6319 of the lens element 6313 abut with each other. Furthermore, the curve-shaped strip structures 150 are closer to the optical effective portion 130 than the abutting surface 190 to the optical effective portion 130. Therefore, it is favorable for reducing the shrinkage degrees of the optical effective portion 130 and maintaining the molding quality of the optical effective portion 130.

The curve-shaped strip structures 150 of the plastic lens element 100 may not be in contact with the optical elements of the optical lens set. Specifically, the curve-shaped strip structures 150 are not in contact with the lens element 6313 and the light blocking sheet 6381, which are both adjacent to the plastic lens element 100. The curve-shaped strip structures 152 are not in contact with the light blocking sheet 6382, which is adjacent to the plastic lens element 100. Therefore, the curve-shaped strip structures 150 and 152 would effectively prevent from affecting the dense arrangement and reducing the reflection attenuation function, which are resulted from the damaging of the curve-shaped strip structures 150 and 152 during the assembling process of the lens module 6000.

In addition, the curve-shaped strip structures 250 of the plastic annular optical element 200 and the curve-shaped strip structures 350 of the plastic annular optical element 300 may not be in contact with the optical elements of the optical lens set. Specifically, the curve-shaped strip structures 250 are not in contact with the light blocking sheets 6382 and 6383, which are both adjacent to the plastic annular optical element 200. The curve-shaped strip structures 350 are not in contact with the lens element 6315 and the annular optical element 6391, which are adjacent to the plastic annular optical element 300. Therefore, the curve-shaped strip structures 250 and 350 would effectively prevent from the affecting the dense arrangement and reducing the reflection attenuation function, which are resulted from the damaging of the curve-shaped strip structures 250 and 350 during the assembling process of the lens module 6000.

7th Embodiment

Figure 7:
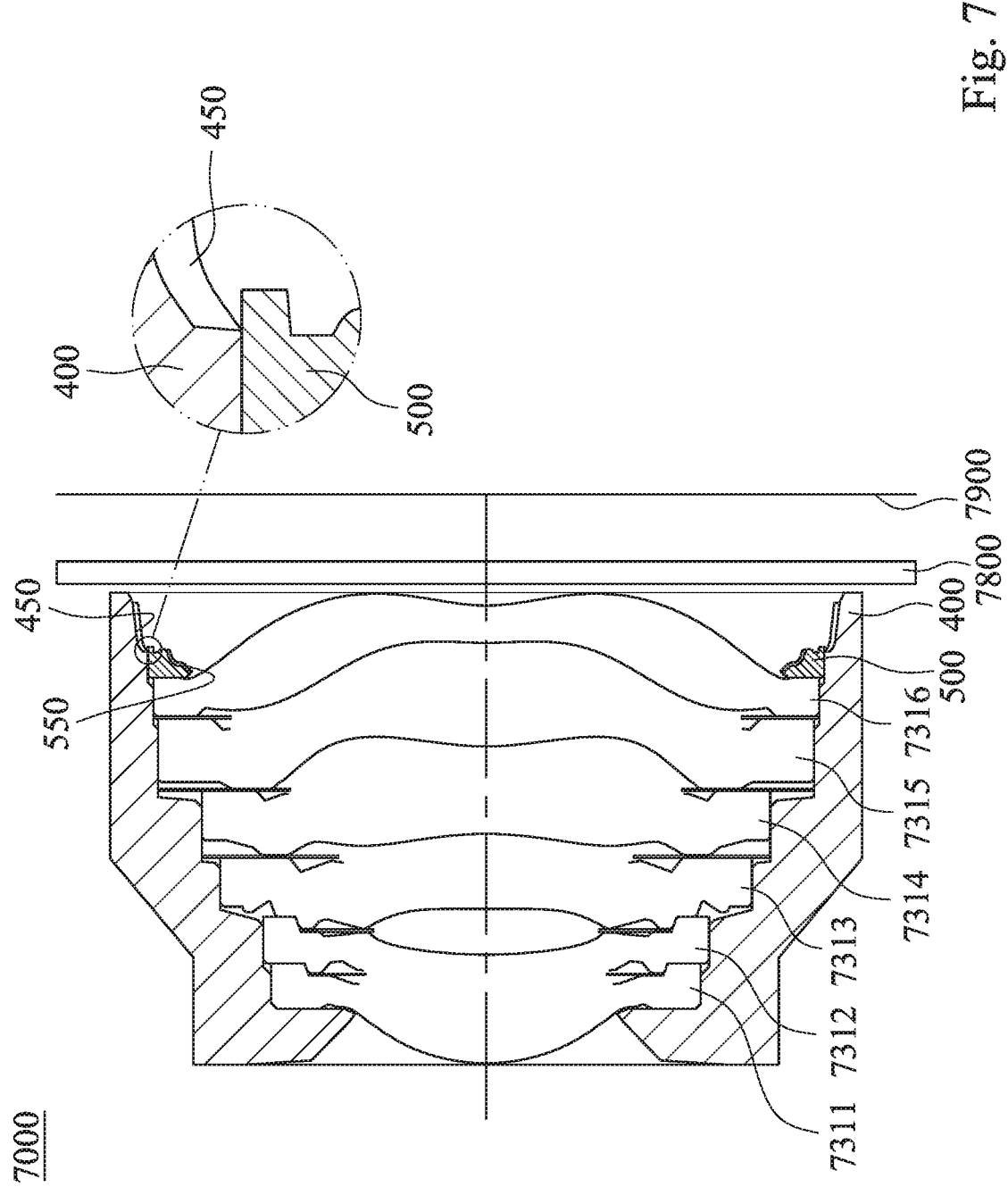
FIG. 7 is a schematic view of a lens module according to the 7th embodiment of the present disclosure.

FIG. 7 is a schematic view of a lens module 7000 according to the 7th embodiment of the present disclosure, wherein some details of optical elements are omitted. In FIG. 7, the lens module 7000 includes an optical lens set (its reference numeral is omitted herein). The optical lens set includes a plurality of optical elements, wherein one of the optical elements is the plastic annular optical element 400 of the 4th embodiment according to the present disclosure, and the plastic annular optical element 400 is a lens barrel. Another one of the optical elements is the plastic annular optical element 500 of the 5th embodiment according to the present disclosure, and the plastic annular optical element 500 is a retainer. The other details of the plastic annular optical elements 400 and 500 have been described in the foregoing paragraphs of the 4th and 5th embodiments respectively and will not be described again herein.

In detail, the optical lens set of the lens module 7000 includes lens elements 7311, 7312, 7313, 7314, 7315, 7316, a glass panel 7800 and an image surface 7900 in order from an object side to an image side, wherein the optical lens set has a total of six lens elements (7311, 7312, 7313, 7314, 7315 and 7316), and the optical lens set may further include other optical elements.

The plastic annular optical element 400 is a lens barrel, wherein the lens elements 7311, 7312, 7313, 7314, 7315 and 7316 are disposed along the central axis z (i.e. an optical axis of the optical lens set) in the plastic annular optical element 400, and the plastic annular optical element 500 is also disposed in the plastic annular optical element 400, Therefore, the curve-shaped strip structures 450 ensure the structural strength and the roundness of the plastic annular optical element 400, and thereby it is advantageous to the assembling accuracy and the optical specification of the lens module 7000.

In FIG. 7, the curve-shaped strip structures 450 of the plastic annular optical element 400 and the curve-shaped strip structures 550 of the plastic annular optical element 500 may not be in contact with the optical elements of the optical lens set. Specifically, the curve-shaped strip structures 450 are not in contact with the plastic annular optical element 500, which is adjacent to the plastic annular optical element 400. The curve-shaped strip structures 550 are not in contact with the lens element 7316 and the plastic annular optical element 400, which are adjacent to the plastic annular optical element 500. Furthermore, it shall be understood that the curve-shaped strip structures 450 and 550 may be farther away from other optical lens elements by designing and adjusting the size of the curve-shaped strip structures 450 and 550 as actually needed.

8th Embodiment

Figure 8A:
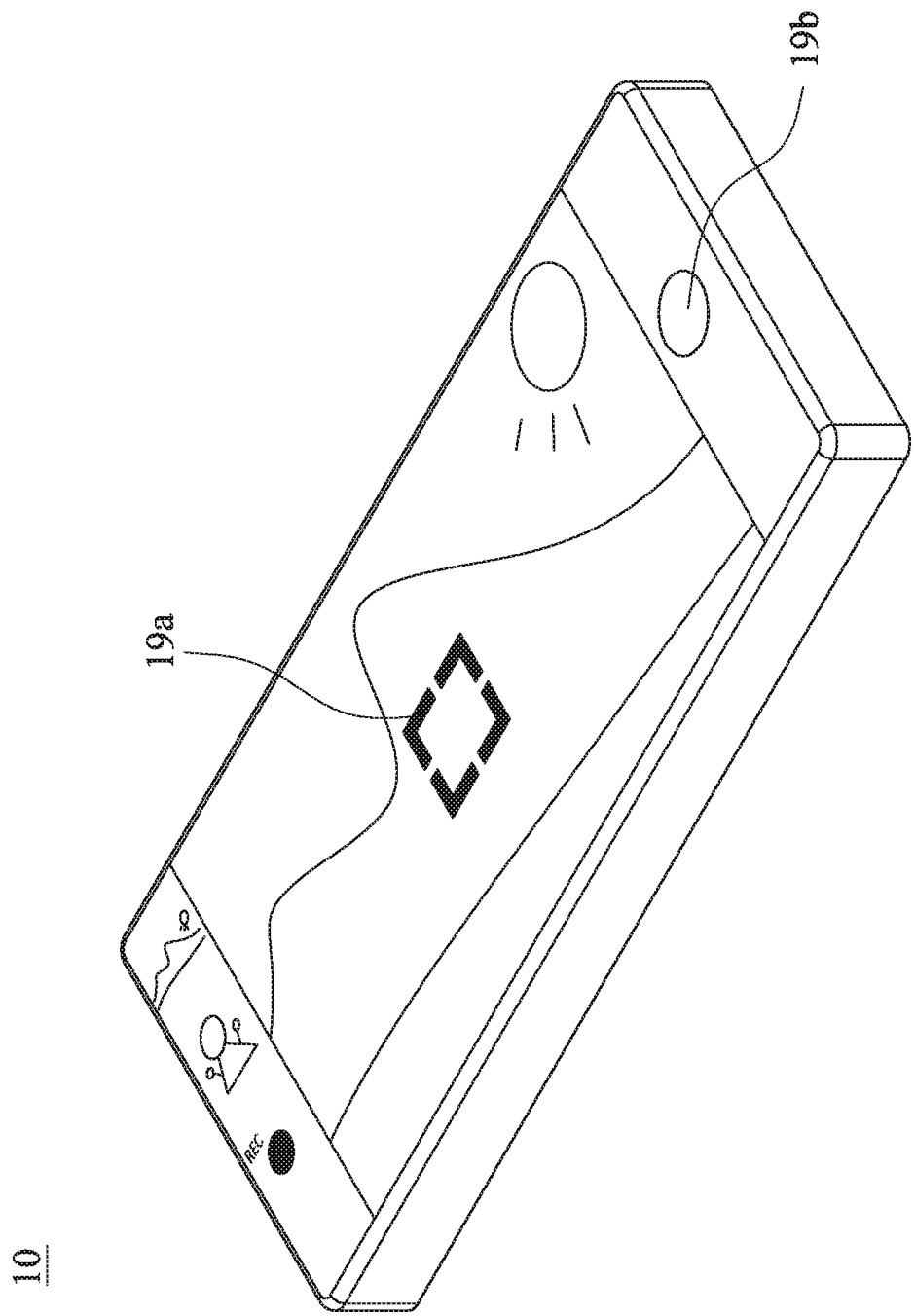
FIG. 8A shows a schematic view of an electronic device according to the 8th embodiment of the present disclosure.
Figure 8B:
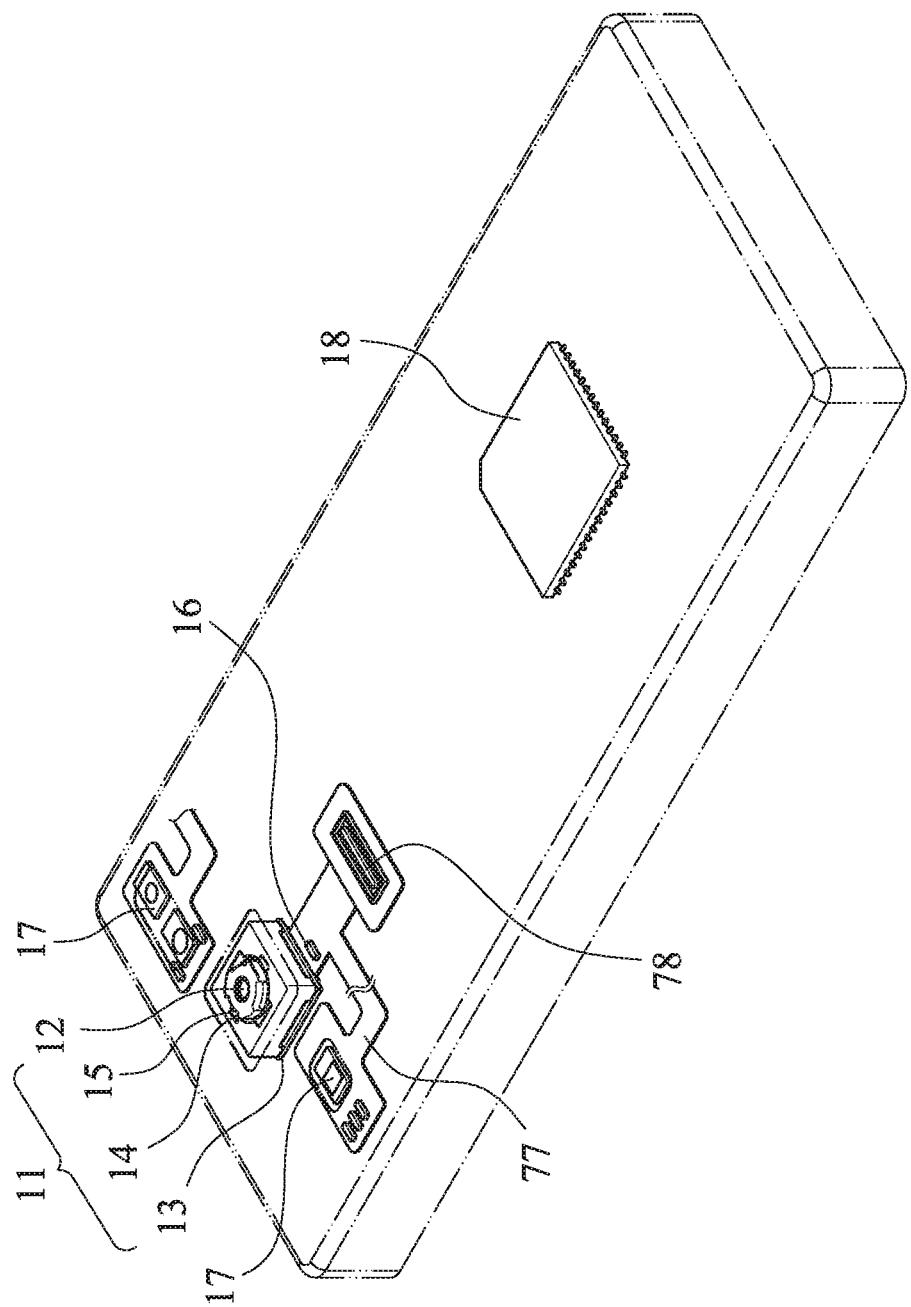
FIG. 8B shows another schematic view of the electronic device according to the 8th embodiment.

FIG. 8A shows a schematic view of an electronic device 10 according to the 8th embodiment of the present disclosure, FIG. 8B shows another schematic view of the electronic device 10 according to the 8th embodiment, and particularly, FIG. 8A and FIG. 8B are schematic views related to a camera of the electronic device 10. In FIG. 8A and FIG. 8B, the electronic device 10 of the 8th embodiment is a smart phone, wherein the electronic device 10 includes a camera module 11. The camera module 11 includes a lens module 12 according to the present disclosure and an image sensor 13, wherein the image sensor 13 is disposed on an image surface (not shown in drawings) of the lens module 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 8th embodiment can be a touch screen 19a, a button 19b and etc. At this moment, the imaging light Is converged on the image sensor 13 of the lens module 12, and the electronic signal associated with image is output to an image signal processor (ISP) 18.

Figure 8C:
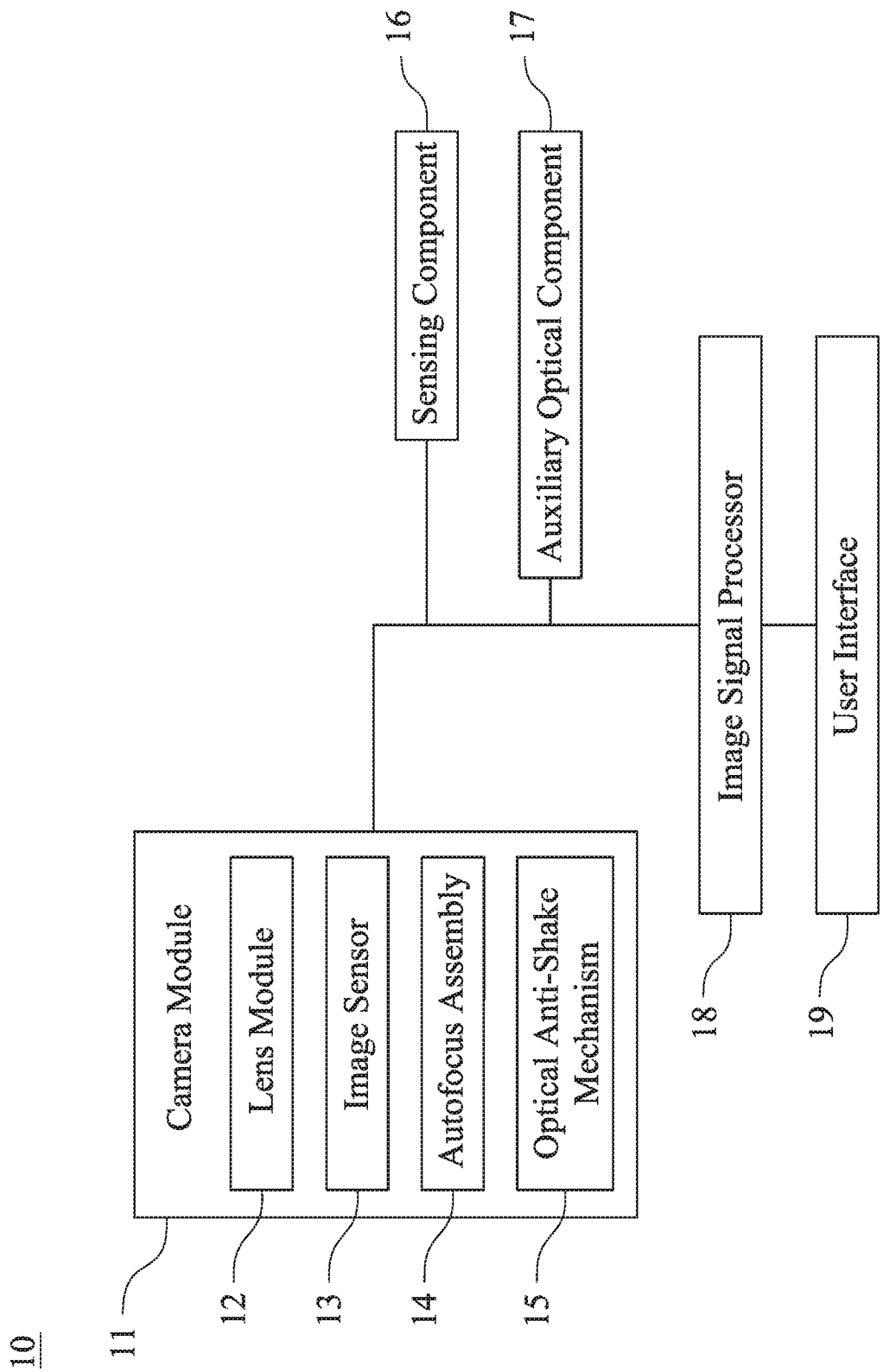
FIG. 8C shows a block diagram of the electronic device according to the 8th embodiment.

FIG. 8C shows a block diagram of the electronic device 10 according to the 8th embodiment, and in particular, the block diagram is related to the camera of the electronic device 10. In FIG. 8A to FIG. 8C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 8B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 8th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

9th Embodiment

Figure 9:
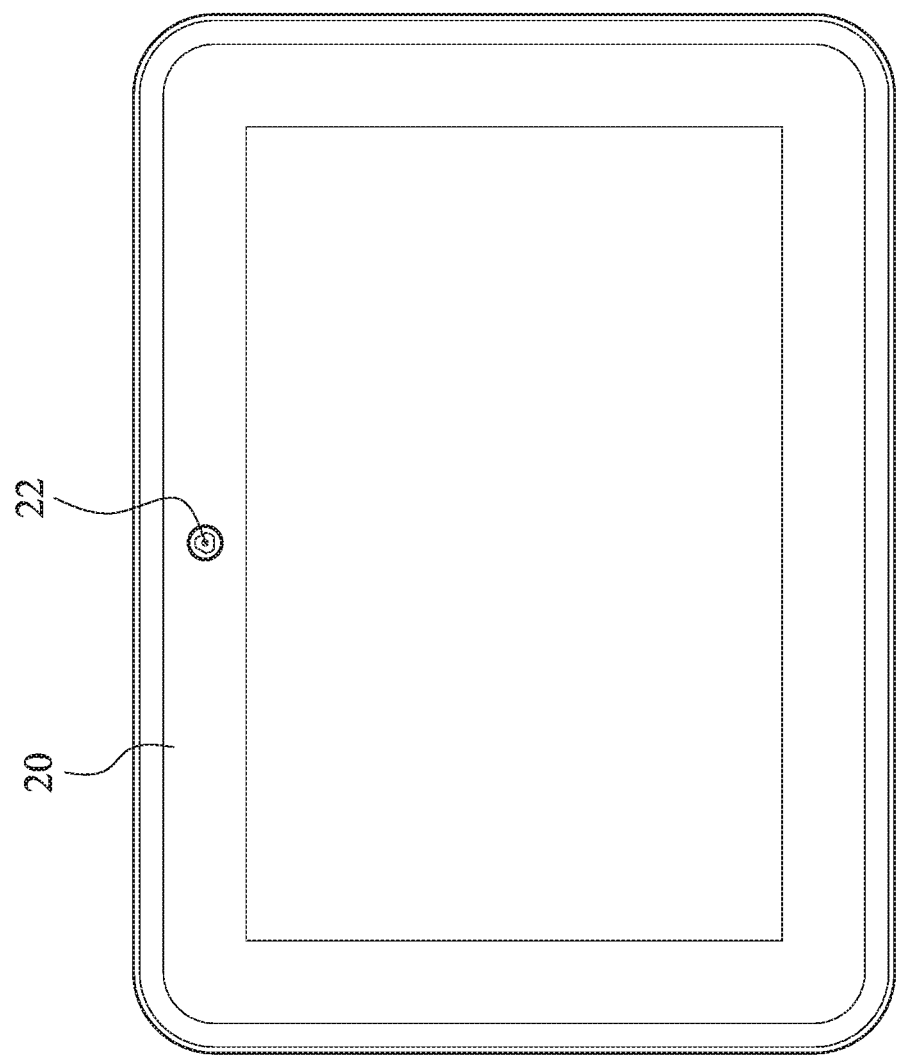
FIG. 9 shows an electronic device according to the 9th embodiment of the present disclosure.

FIG. 9 shows an electronic device 20 according to the 9th embodiment of the present disclosure. The electronic device 20 of the 9th embodiment is a tablet personal computer. The electronic device 20 includes a lens module 22 according to the present disclosure.

10th Embodiment

Figure 10:
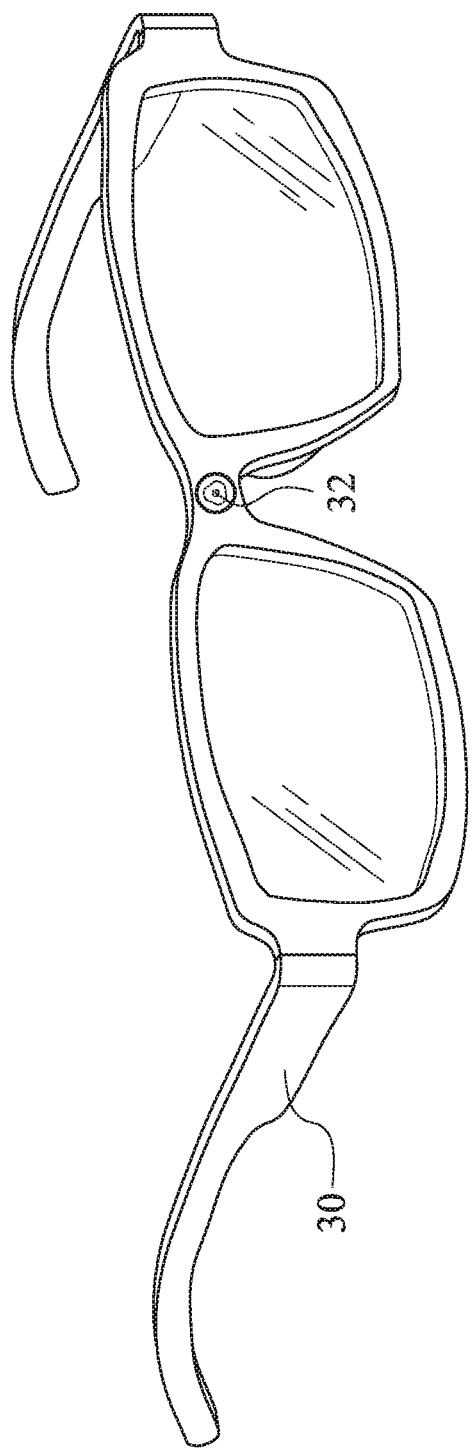
FIG. 10 shows an electronic device according to the 10th embodiment of the present disclosure.
Figure 11:
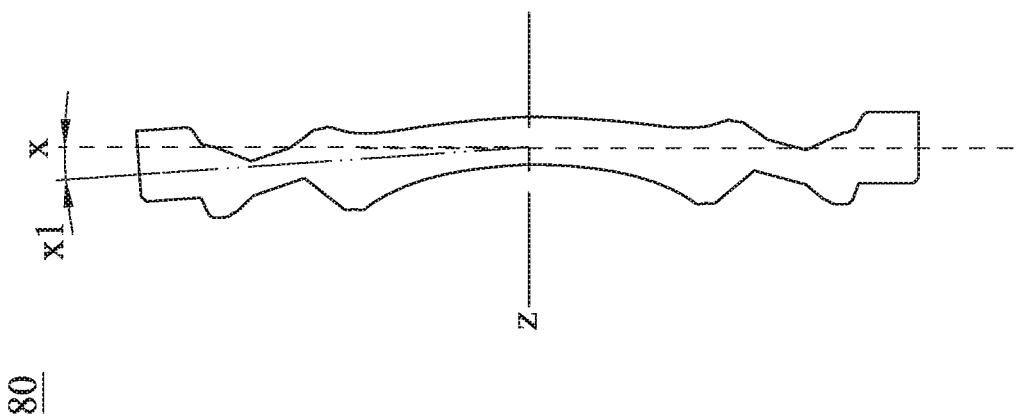
FIG. 11 is a schematic view of a conventional plastic lens element.
Figure 12B:
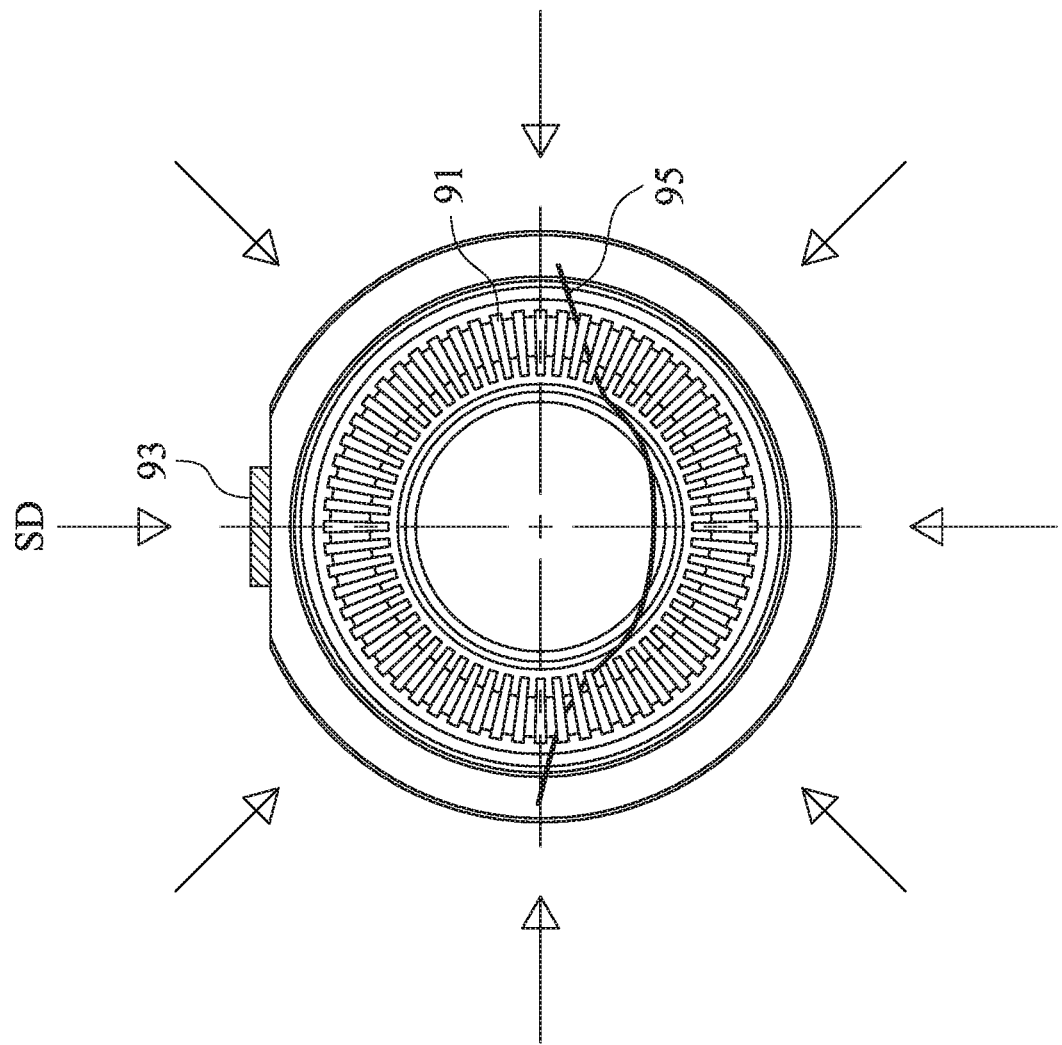
FIG. 12B is a top view of the conventional plastic lens element of FIG. 12A.
Figure 12A:
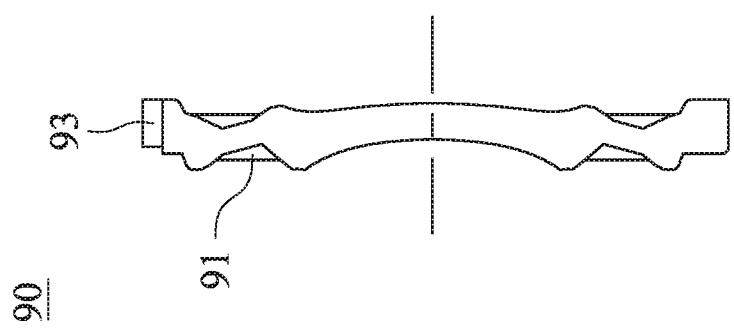
FIG. 12A is a schematic view of another conventional plastic lens element.

FIG. 10 shows an electronic device 30 according to the 10th embodiment of the present disclosure. The electronic device 30 of the 10th embodiment is a wearable device. The electronic device 30 includes a lens module 32 according to the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A plastic lens element comprising, in order from a central axis to an edge thereof:
   an optical effective portion; and
   a lens peripheral portion surrounding the optical effective portion and comprising:
      a plurality of curve-shaped strip structures, wherein each of the curve-shaped strip structures is located and extended along a radial direction of the central axis, each of the curve-shaped strip structures is curved in a concave form, the curve-shaped strip structures are prearranged in a circumferential direction of the central axis and around the optical effective portion, and the curve-shaped strip structures are not directly connected to the optical effective portion;
   wherein each of the curve-shaped strip structures comprises at least one inverse curve structure.

2. The plastic lens element of claim 1, wherein the plastic lens element comprising the curve-shaped strip structures is formed integrally.

3. The plastic lens element of claim 2, wherein a transverse cross-sectional plane of each of the curve-shaped strip structures is triangular.

4. The plastic lens element of claim 1, wherein a number of the curve-shaped strip structures is greater than or equal to 105, and smaller than or equal to 380.

5. The plastic lens element of claim 2, wherein each of the curve-shaped strip structures comprises a concave curve portion, a curvature radius of the concave curve portion is R, and the following condition is satisfied:

$$0.02 \text{ mm} < R < 2.0 \text{ mm}.$$

6. The plastic lens element of claim 2, wherein each of the curve-shaped strip structures comprises a concave curve portion, and the concave curve portion is a conic section.

7. The plastic lens element of claim 1, wherein each of the curve-shaped strip structures comprises a concave curve portion, an angle between two tangential directions of two ends respectively of the concave curve portion is β, and the following condition is satisfied:

$$90 \text{ degrees} < \beta < 170 \text{ degrees}.$$

8. The plastic lens element of claim 1, wherein the plastic lens element is made by an injection molding method, an injection molding shrinkage rate of the plastic lens element is S, and the following condition is satisfied:

$$0.05\% < S < 1.4\%.$$

9. The plastic lens element of claim 1, wherein each of the curve-shaped strip structures further comprises a concave curve portion and at least one inflection point, the inflection point connects the concave curve portion and the inverse curve structure, a greatest depth parallel to the central axis between the inflection point and the concave curve portion is h, and the following condition is satisfied:

$$0.05 \text{ mm} < h < 0.35 \text{ mm}.$$

10. The plastic lens element of claim 1, wherein each of the curve-shaped strip structures further comprises a concave curve portion and at least one inflection point, the inflection point connects the concave curve portion and the inverse curve structure, a greatest depth parallel to the central axis between the inflection point and the concave curve portion is h, a central thickness of the plastic lens element is CT, and the following condition is satisfied:

0.05 mm<$h$<$CT$.

11. A lens module, comprising an optical lens set, wherein the optical lens set comprises:
a plurality of optical elements, wherein one of the optical elements is the plastic lens element of claim 1.

12. The lens module of claim 11, wherein an object-side surface of the plastic lens element comprises an abutting surface for abutting with another one of the optical elements, and the curve-shaped strip structures are closer to the optical effective portion than the abutting surface to the optical effective portion.

13. The lens module of claim 12, wherein the curve-shaped strip structures are not in contact with the optical elements.

14. An electronic device, comprising:
the lens module of claim 11.

15. A plastic annular optical element, comprising:
an outer diameter surface surrounding a central axis of the plastic annular optical element; and
an inner annular surface surrounding the central axis and forming a central hole, wherein the inner annular surface comprises:
a plurality of curve-shaped strip structures, wherein each of the curve-shaped strip structures is located and extended along a radial direction of the central axis, each of the curve-shaped strip structures is curved in a concave form, and the curve-shaped strip structures are prearranged in a circumferential direction of the central axis and around the central hole;
wherein each of the curve-shaped strip structures comprises at least one inverse curve structure.

16. The plastic annular optical element of claim 15, wherein a number of the curve-shaped strip structures is greater than or equal to 105, and smaller than or equal to 380.

17. The plastic annular optical element of claim 16, wherein a transverse cross-sectional plane of each of the curve-shaped strip structures is triangular.

18. The plastic annular optical element of claim 15, wherein each of the curve-shaped strip structures comprises a concave curve portion, an angle between two tangential directions of two ends respectively of the concave curve portion is β, and the following condition is satisfied:

90 degrees<$β$<170 degrees.

19. The plastic annular optical element of claim 15, wherein each of the curve-shaped strip structures comprises a concave curve portion, a curvature radius of the concave curve portion is R, and the following condition is satisfied:

0.02 mm<$R$<2.0 mm.

20. The plastic annular optical element of claim 15, wherein each of the curve-shaped strip structures comprises a concave curve portion being aspheric, a conic coefficient of an equation of an aspheric surface profile of the concave curve portion is k, and the following condition is satisfied:

−10<$k$<10.

21. The plastic annular optical element of claim 15, wherein the plastic annular optical element is made by an injection molding method, an injection molding shrinkage rate of the plastic annular optical element is S, and the following condition is satisfied:

0.05%<$S$<1.4%.

22. The plastic annular optical element of claim 21, wherein the injection molding shrinkage rate of the plastic annular optical element is S, and the following condition is satisfied:

0.1%<$S$≤1.0%.

23. A lens module, comprising an optical lens set, wherein the optical lens set comprises:
a plurality of optical elements, wherein one of the optical elements is the plastic annular optical element of claim 15.

24. The lens module of claim 23, wherein the curve-shaped strip structures are not in contact with the optical elements.

25. The lens module of claim 23, wherein the plastic annular optical element is a lens barrel, and the others of the optical elements are disposed in the plastic annular optical element.

26. An electronic device, comprising:
the lens module of claim 23.

* * * * *